(12) United States Patent
Wegerich et al.

(10) Patent No.: US 7,539,597 B2
(45) Date of Patent: May 26, 2009

(54) DIAGNOSTIC SYSTEMS AND METHODS FOR PREDICTIVE CONDITION MONITORING

(75) Inventors: Stephan W. Wegerich, Glendale Heights, IL (US); Andre Wolosewicz, Woodridge, IL (US); R. Matthew Pipke, Oak Park, IL (US)

(73) Assignee: SmartSignal Corporation, Lisle, IL (US)

( * ) Notice: Subject to any disclaimer, the term of this patent is extended or adjusted under 35 U.S.C. 154(b) by 163 days.

(21) Appl. No.: 10/681,888

(22) Filed: Oct. 9, 2003

(65) Prior Publication Data

US 2004/0078171 A1 Apr. 22, 2004

Related U.S. Application Data

(63) Continuation-in-part of application No. 10/277,307, filed on Oct. 22, 2002, now abandoned, which is a continuation-in-part of application No. 09/832,166, filed on Apr. 10, 2001, now abandoned.

(51) Int. Cl.
*G06F 17/00* (2006.01)
(52) U.S. Cl. .................. 702/185; 702/182; 702/183; 700/110; 700/108; 703/2; 706/20; 707/104.1
(58) Field of Classification Search .................. 702/35, 702/81, 115, 127, 182, 183, 184, 185, 188; 703/2; 700/108, 110; 706/20; 707/104.1
See application file for complete search history.

(56) References Cited

U.S. PATENT DOCUMENTS

| | | | |
|---|---|---|---|
| 3,045,221 A | 7/1962 | Roop | |
| 4,060,716 A | 11/1977 | Pekrul et al. | |
| 4,336,595 A | 6/1982 | Adams et al. | |
| 4,402,054 A | 8/1983 | Osborne et al. | |
| RE31,750 E | 11/1984 | Morrow | |
| 4,480,480 A | 11/1984 | Scott et al. | |
| 4,639,882 A | 1/1987 | Keats | |
| 4,707,796 A | 11/1987 | Calabro et al. | |

(Continued)

FOREIGN PATENT DOCUMENTS

JP 06-278179 A 10/1994

(Continued)

OTHER PUBLICATIONS

"MSET Modeling of Crystal River-3 Venturi Flow Meters" by J.P. Herzog, S.W. Wegerich, K.C. Gross and F.K. Bockhorst, 6th International Conference on Nuclear Engineering, ICONE-6169, May 10-14, 1998, Copyright 1998 ASME (12 pp.).

(Continued)

*Primary Examiner*—Carol S Tsai
(74) *Attorney, Agent, or Firm*—Fitch, Even, Tabin & Flannery

(57) ABSTRACT

A system for empirically diagnosing a condition of a monitored system. Estimates of monitored parameters from a model of the system provide residual values that can be analyzed for failure mode signature recognition. Residual values can also be tested for alert (non-zero) conditions, and patterns of alerts thus generated are analyzed for failure mode signature patterns. The system employs a similarity operator for signature recognition and also for parameter estimation. Failure modes are empirically determined, and precursor data is automatically analyzed to determine differentiable signatures for failure modes.

39 Claims, 18 Drawing Sheets

U.S. PATENT DOCUMENTS

| | | | |
|---|---|---|---|
| 4,761,748 A | 8/1988 | Le Rat et al. | |
| 4,796,205 A | 1/1989 | Ishii et al. | |
| 4,823,290 A | 4/1989 | Fasack et al. | |
| 4,937,763 A | 6/1990 | Mott | |
| 4,965,513 A | 10/1990 | Haynes et al. | |
| 4,978,909 A | 12/1990 | Hendrix et al. | |
| 4,985,857 A | 1/1991 | Bajpai et al. | |
| 5,003,950 A | 4/1991 | Kato et al. | |
| 5,005,142 A | 4/1991 | Lipchak et al. | |
| 5,025,499 A | 6/1991 | Inoue et al. | |
| 5,052,630 A | 10/1991 | Hinsey et al. | |
| 5,093,792 A | 3/1992 | Taki et al. | |
| 5,113,483 A | 5/1992 | Keeler et al. | |
| 5,119,287 A | 6/1992 | Nakamura et al. | |
| 5,123,017 A | 6/1992 | Simpkins et al. | |
| 5,195,046 A | 3/1993 | Gerardi et al. | |
| 5,210,704 A | 5/1993 | Husseiny | |
| 5,223,207 A | 6/1993 | Gross et al. | |
| 5,251,285 A | 10/1993 | Inoue et al. | |
| 5,285,494 A | 2/1994 | Sprecher et al. | |
| 5,309,351 A | 5/1994 | McCain et al. | |
| 5,311,562 A | 5/1994 | Palusamy et al. | |
| 5,325,304 A | 6/1994 | Aoki | |
| 5,327,349 A | 7/1994 | Hoste | |
| 5,386,373 A | 1/1995 | Keeler et al. | |
| 5,414,632 A | 5/1995 | Mochizuki et al. | |
| 5,420,571 A | 5/1995 | Coleman et al. | |
| 5,421,204 A | 6/1995 | Svaty, Jr. | |
| 5,445,347 A | 8/1995 | Ng | |
| 5,446,671 A | 8/1995 | Weaver et al. | |
| 5,446,672 A | 8/1995 | Boldys | |
| 5,455,777 A | 10/1995 | Fujiyama et al. | |
| 5,459,675 A | 10/1995 | Gross et al. | |
| 5,463,768 A | 10/1995 | Cuddihy et al. | |
| 5,463,769 A | 10/1995 | Cuddihy et al. | |
| 5,465,321 A * | 11/1995 | Smyth | 706/20 |
| 5,481,647 A | 1/1996 | Brody et al. | |
| 5,486,997 A | 1/1996 | Reismiller et al. | |
| 5,496,450 A * | 3/1996 | Blumenthal et al. | 205/782 |
| 5,500,940 A | 3/1996 | Skeie | |
| 5,502,543 A | 3/1996 | Aboujaoude | |
| 5,539,638 A | 7/1996 | Keeler et al. | |
| 5,548,528 A | 8/1996 | Keeler et al. | |
| 5,553,239 A | 9/1996 | Heath et al. | |
| 5,559,710 A | 9/1996 | Shahraray et al. | |
| 5,566,092 A * | 10/1996 | Wang et al. | 702/185 |
| 5,579,232 A | 11/1996 | Tong et al. | |
| 5,586,066 A | 12/1996 | White et al. | |
| 5,596,507 A | 1/1997 | Jones et al. | |
| 5,600,726 A | 2/1997 | Morgan et al. | |
| 5,602,733 A | 2/1997 | Rogers et al. | |
| 5,608,845 A | 3/1997 | Ohtsuka et al. | |
| 5,612,886 A | 3/1997 | Weng | |
| 5,617,342 A | 4/1997 | Elazouni | |
| 5,623,109 A | 4/1997 | Uchida et al. | |
| 5,629,878 A | 5/1997 | Kobrosly | |
| 5,638,413 A | 6/1997 | Uematsu et al. | |
| 5,657,245 A | 8/1997 | Hecht et al. | |
| 5,663,894 A | 9/1997 | Seth et al. | |
| 5,668,944 A | 9/1997 | Berry | |
| 5,671,635 A | 9/1997 | Nadeau et al. | |
| 5,680,409 A | 10/1997 | Qin et al. | |
| 5,680,541 A | 10/1997 | Kurosu et al. | |
| 5,682,317 A | 10/1997 | Keeler et al. | |
| 5,708,780 A | 1/1998 | Levergood et al. | |
| 5,710,723 A | 1/1998 | Hoth et al. | |
| 5,727,144 A | 3/1998 | Brady et al. | |
| 5,737,228 A | 4/1998 | Ishizuka et al. | |
| 5,748,469 A | 5/1998 | Pyotsia | |
| 5,748,496 A | 5/1998 | Takahashi et al. | |
| 5,751,580 A | 5/1998 | Chi | |
| 5,754,451 A | 5/1998 | Williams | |
| 5,754,965 A | 5/1998 | Hagenbuch | |
| 5,761,090 A | 6/1998 | Gross et al. | |
| 5,764,509 A | 6/1998 | Gross et al. | |
| 5,774,379 A | 6/1998 | Gross et al. | |
| 5,787,138 A | 7/1998 | Ocieczek et al. | |
| 5,817,958 A | 10/1998 | Uchida et al. | |
| 5,818,716 A | 10/1998 | Chin et al. | |
| 5,822,212 A | 10/1998 | Tanaka et al. | |
| 5,841,677 A | 11/1998 | Yang et al. | |
| 5,842,157 A | 11/1998 | Wehhofer et al. | |
| 5,864,773 A | 1/1999 | Barna et al. | |
| 5,895,177 A | 4/1999 | Iwai et al. | |
| 5,905,989 A | 5/1999 | Biggs | |
| 5,909,368 A | 6/1999 | Nixon et al. | |
| 5,913,911 A | 6/1999 | Beck et al. | |
| 5,930,156 A | 7/1999 | Kennedy | |
| 5,930,779 A | 7/1999 | Knoblock et al. | |
| 5,933,352 A | 8/1999 | Salut | |
| 5,933,818 A | 8/1999 | Kasravi et al. | |
| 5,940,298 A | 8/1999 | Pan et al. | |
| 5,946,661 A | 8/1999 | Rothschild et al. | |
| 5,946,662 A | 8/1999 | Ettl et al. | |
| 5,950,147 A | 9/1999 | Sarangapani et al. | |
| 5,956,487 A | 9/1999 | Venkatraman et al. | |
| 5,961,560 A | 10/1999 | Kemner | |
| 5,987,399 A | 11/1999 | Wegerich et al. | |
| 5,993,041 A | 11/1999 | Toba | |
| 5,995,916 A | 11/1999 | Nixon et al. | |
| 6,006,192 A | 12/1999 | Cheng et al. | |
| 6,006,260 A | 12/1999 | Barrick, Jr. et al. | |
| 6,014,598 A | 1/2000 | Duyar et al. | |
| 6,021,396 A | 2/2000 | Ramaswamy et al. | |
| 6,029,097 A | 2/2000 | Branicky et al. | |
| 6,049,741 A | 4/2000 | Kawamura | |
| 6,049,827 A | 4/2000 | Sugauchi et al. | |
| 6,088,626 A | 7/2000 | Lilly et al. | |
| 6,104,965 A | 8/2000 | Lim et al. | |
| 6,110,214 A | 8/2000 | Klimasauskas | |
| 6,115,653 A | 9/2000 | Berstrom et al. | |
| 6,125,351 A | 9/2000 | Kauffman | |
| 6,128,540 A | 10/2000 | Van Der Vegt et al. | |
| 6,128,543 A | 10/2000 | Hitchner | |
| 6,141,647 A | 10/2000 | Meijer et al. | |
| 6,144,893 A | 11/2000 | Van Der Vegt et al. | |
| 6,278,962 B1 | 8/2001 | Klimasauskas et al. | |
| 6,393,373 B1 * | 5/2002 | Duyar et al. | 702/115 |
| 6,480,810 B1 * | 11/2002 | Cardella et al. | 702/188 |
| 6,519,552 B1 | 2/2003 | Sampath et al. | |
| 6,526,356 B1 * | 2/2003 | DiMaggio et al. | 702/35 |
| 6,532,426 B1 * | 3/2003 | Hooks et al. | 702/81 |
| 6,556,939 B1 * | 4/2003 | Wegerich | 702/127 |
| 6,590,362 B2 * | 7/2003 | Parlos et al. | 318/799 |
| 6,609,036 B1 | 8/2003 | Bickford | |
| 6,625,569 B2 | 9/2003 | James et al. | |
| 6,687,654 B2 * | 2/2004 | Smith et al. | 702/183 |
| 6,853,920 B2 * | 2/2005 | Hsiung et al. | 702/1 |
| 6,898,554 B2 * | 5/2005 | Jaw et al. | 702/185 |
| 6,975,962 B2 * | 12/2005 | Wegerich et al. | 702/182 |
| 7,027,953 B2 * | 4/2006 | Klein | 702/184 |
| 7,050,875 B2 * | 5/2006 | Cribbs et al. | 700/110 |
| 2002/0055826 A1 | 5/2002 | Wegerich et al. | |
| 2002/0152056 A1 * | 10/2002 | Herzog et al. | 703/2 |
| 2006/0036403 A1 * | 2/2006 | Wegerich et al. | 702/183 |

FOREIGN PATENT DOCUMENTS

| | | |
|---|---|---|
| JP | 08-220279 A | 8/1996 |
| WO | WO0067412 | 11/2000 |

| WO | WO0167262 | 9/2001 |

OTHER PUBLICATIONS

"Application of a New Technique for Modeling System Behavior" by Paul J. O'Sullivan, presented at the ISA Symposium, Edmonton, Alberta, May 1, 1991, Copyright 1991 Instrument Society of America (21pp.).

"A Universal, Fault-Tolerant, Non-Linear Analytic Network for Modeling and Fault Detection," by J.E. Mott, R.W. King, L.R. Monson, D.L. Olson, and J.D. Staffon, Proceedings of the 8h Power Plant Dynamics, Control & TEsting Symposium, KNoxville, TN, May 27-29, 1992 (14pp.).

ModelWare Product Review by Robert D. Flori, reprinted from Computerized Investing, Sep./Oct. 1992, vol. XI, No. 5, Copyright by The American Association of Individual Investors (pp. 8-10).

ModelWare A New Approach to Prediction by Ken Tucker, reprinted form PC AI Magazine, Jan./Feb. 1993, pp. 14, 15, 30.

"Similarity Based Regression: Applied Advanced Pattern Recognition for Power Plant Analysis," by E.J. hansen and M.B. Caudill, presented at the 1994 EPRI Heat Rate Improvement Conference (9pp.).

"Applied Pattern Recognition for Plant Monitoring and Data Validation," by Ron Griebenow, E.J. Hansen, and A.L. Sudduth, presented at the Fifth International Joint ISA POWID/EPRI Controls and Instrumentation Conference, La Jolla, CA, Jun. 19-21, 1995 (11pp.).

"A Fault-Tolerant Sensory Diagnostic System for Intelligent Vehicle Application" by Ralph M. Singer, Kenny C. Gross, and Stephan Wegerich, presented at the IEEE International Symposium on Intelligent Vehicles, Detroit, MI, Sep. 25-26, 1995 (7pp.).

"Model-Based Nuclear Power Plant Monitoring and Fault Detection: Theorectical Foundations," by Ralph M. Singer, Kenny C. Gross, James P. Herzog. Ronald W. King, and Stephan Wegerich, presented at the International Conference on Intelligent System Application to Power Systems (ISAP '97), Jul. 6-10, 1997, Seoul, Korea (pp. 60-65).

"Application of a Model-Based Fault Detection System to Nuclear Plant Signals," by K.C. Gross, R.M. Singer, S.W. Wegerich, J.P. Herzog, R. VanAlstine, and F. Bockhorst, presented at the International Conference on Intelligent System Application to Power Systems (ISAP '97), Jul. 6-10, 1997, Seoul, Korea (pp. 66-70).

* cited by examiner

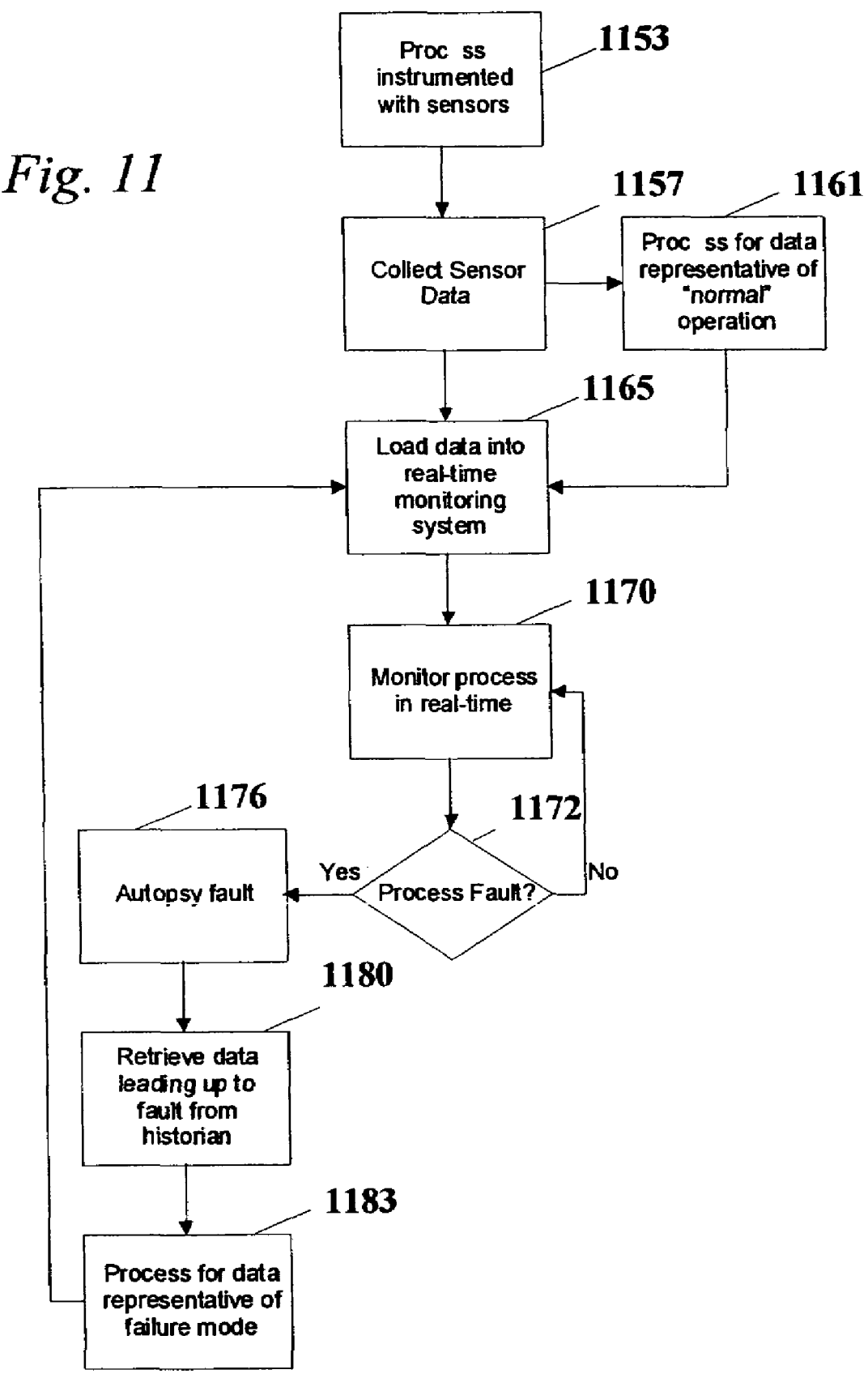

DIAGNOSTIC SYSTEMS AND METHODS FOR PREDICTIVE CONDITION MONITORING

CROSS-REFERENCE TO RELATED APPLICATION

This application is a continuation-in-part of application Ser. No. 10/277,307 filed 22 Oct. 2002, now abandoned; which is a continuation-in-part of application Ser. No. 09/832,166 filed 10 Apr. 2001, now abandoned.

BACKGROUND OF THE INVENTION

1. Field of the Invention

The present invention relates generally to the field of early detection and diagnosis of incipient machine failure or process upset. More particularly, the invention is directed to model-based monitoring of processes and machines, and experience-based diagnostics.

2. Brief Description of the Related Art

A variety of new and advanced techniques have emerged in industrial process control, machine control, system surveillance, and condition based monitoring to address drawbacks of traditional sensor-threshold-based control and alarms. The traditional techniques did little more than provide responses to gross changes in individual metrics of a process or machine, often failing to provide adequate warning to prevent unexpected shutdowns, equipment damage, loss of product quality or catastrophic safety hazards.

According to one branch of the new techniques, empirical models of the monitored process or machine are used in failure detection and in control. Such models effectively leverage an aggregate view of surveillance sensor data to achieve much earlier incipient failure detection and finer process control. By modeling the many sensors on a process or machine simultaneously and in view of one another, the surveillance system can provide more information about how each sensor (and its measured parameter) ought to behave. Additionally, these approaches have the advantage that no additional instrumentation is typically needed, and sensors in place on the process or machine can be used.

An example of such an empirical surveillance system is described in U.S. Pat. No. 5,764,509 to Gross et al., the teachings of which are incorporated herein by reference. Therein is described an empirical model using a similarity operator against a reference library of known states of the monitored process, and an estimation engine for generating estimates of current process states based on the similarity operation, coupled with a sensitive statistical hypothesis test to determine if the current process state is a normal or abnormal state. The role of the similarity operator in the above empirical surveillance system is to determine a metric of the similarity of a current set of sensor readings to any of the snapshots of sensor readings contained in the reference library. The similarity metric thusly rendered is used to generate an estimate of what the sensor readings ought to be, from a weighted composite of the reference library snapshots. The estimate can then be compared to the current readings for monitoring differences indicating incipient process upset, sensor failure or the like. Other empirical model-based monitoring systems known in the art employ neural networks to model the process or machine being monitored.

Early detection of sensor failure, process upset or machine fault are afforded in such monitoring systems by sensitive statistical tests such as the sequential probability ratio test, also described in the aforementioned patent to Gross et al. The result of such a test when applied to the residual of the difference of the actual sensor signal and estimated sensor signal, is a decision as to whether the actual and estimate signals are the same or different, with user-selectable statistical confidence. While this is useful information in itself, directing thinly stretched maintenance resources only to those process locations or machine subcomponents that evidence a change from normal, there is a need to advance monitoring to a diagnostic result, and thereby provide a likely failure mode, rather than just an alert that the signal is not behaving as normal. Coupling a sensitive early detection statistical test with an easy-to-build empirical model and providing not only early warning, but a diagnostic indication of what is the likely cause of a change, comprises an enormously valuable monitoring or control system, and is much sought after in a variety of industries currently.

Due to the inherent complexity of many processes and machines, the task of diagnosing a fault is very difficult. A great deal of effort has been spent on developing diagnostic systems. One approach to diagnosis has been to employ the use of an expert system that is a rule based system for analyzing process or machine parameters according to rules describing the dynamics of the monitored or controlled system developed by an expert. An expert system requires an intense learning process by a human expert to understand the system and to codify his knowledge into a set of rules. Thus, expert system development takes a large amount of time and resources. An expert system is not responsive to frequent design changes to a process or machine. A change in design changes the rules, which requires the expert to determine the new rules and to redesign the system.

What is needed is a diagnostic approach that can be combined with model-based monitoring and control of a process or machine, wherein an expert is not required to spend months developing rules to be implemented in software for diagnosing machine or process fault. A diagnostic system that could be built on the domain knowledge of the industrial user of the monitoring or control system would be ideal. Furthermore, a diagnostic approach is needed that is easily adapted to changing uses of a machine, or changing parameters of a process, as well as design changes to both.

What is further needed is a way to match precursors of impending failure to past patterns of precursors to known failures rapidly, accurately and without significant human expert time and effort.

SUMMARY OF THE INVENTION

The present invention provides unique diagnostic capabilities in a model-based monitoring system for machines and processes. A library of diagnostic conditions is provided as part of routine on-line monitoring of a machine or process via physical parameters instrumented with sensors of any type. Outputs created by the on-line monitoring are compared to the diagnostic conditions library, and if a signature of one or more diagnostic conditions is recognized in these outputs, the system provides a diagnosis of a possible impending failure mode.

The diagnostic capabilities are preferably coupled to a non-parametric empirical-model based system that generates estimates of sensor values in response to receiving actual sensor values from the sensors on the machine or process being monitored. The estimated sensor values generated by the model are subtracted from the actual sensor values to provide residual signals for sensors on the machine or process. When everything is working normally, as modeled by the empirical model, the residual signals are essentially zero with some noise from the underlying physical parameters and the sensor noise. When the process or machine deviates from any recognized and modeled state of operation, that is, when its operation becomes abnormal, these residuals become non-zero. A sensitive statistical test such as the sequential probability ratio test (SPRT) is applied to the residuals to provide the earliest possible decision whether the residuals are remaining around zero or not, often at such an early stage that the residual trend away from zero is still buried in the noise level. For any sensor where a decision is made that the residual is non-zero, an alert is generated on that sensor for the time snapshot in question. An alternative way to generate an alert is to enforce thresholds on the residual itself for each parameter, alerting on that parameter when the thresholds are exceeded. The diagnostic conditions library can be referenced using the residual data itself, or alternatively using the SPRT alert information or the residual threshold alert information. Failure modes are stored in the diagnostic conditions library, along with explanatory descriptions, suggested investigative steps, and suggested repair steps. When the pattern of SPRT alerts or residual threshold alerts matches the signature in the library, the failure mode is recognized, and the diagnosis made. Alternatively, when the residual data pattern is similar to a residual data pattern in the library using a similarity engine, the corresponding failure mode is recognized and the diagnosis made.

Advantageously, the use of a nonparametric-type empirical model, in contrast to a first-principles model or a parametric model, results in estimates and residuals that are uniquely effective in the diagnostic process, especially with respect to personalized modeling of individual instantiations of monitored machines. The present invention is ideal for advanced diagnostic condition monitoring of expensive fleet assets such as aircraft, rental cars, locomotives, tractors, and the like.

The inventive system can comprise software running on a computer, with a memory for storing empirical model information and the diagnostic conditions library. Furthermore, it has data acquisition means for receiving data from sensors on the process or machine being monitored. Typically, the system can be connected to or integrated into a process control system in an industrial setting and acquire data from that system over a network connection. No new sensors need to be installed in order to use the inventive system. The diagnostic outputs of the software can be displayed, or transmitted to a pager, fax or other remote device, or output to a control system that may be disposed to act on the diagnoses for automatic process or machine control. Alternatively, due to the small computing requirements of the present invention, the inventive system can be reduced to an instruction set on a memory chip resident with a processor and additional memory for storing the model and library, and located physically on the process or equipment monitored, such as an automobile or aircraft.

The diagnostic conditions library of the present invention can be empirical, based on machine and process failure autopsies and their associated lead-in sensor data. The number of failure modes in the library is entirely selectable by the user, and the library can be added to in operation in the event that a new failure is encountered that is previously unknown in the library.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiments in conjunction with the accompanying drawings, wherein:

FIG. 11 is a flowchart for establishing a diagnostic library for a process;

DETAILED DESCRIPTION OF THE PREFERRED EMBODIMENTS

Figure 1:
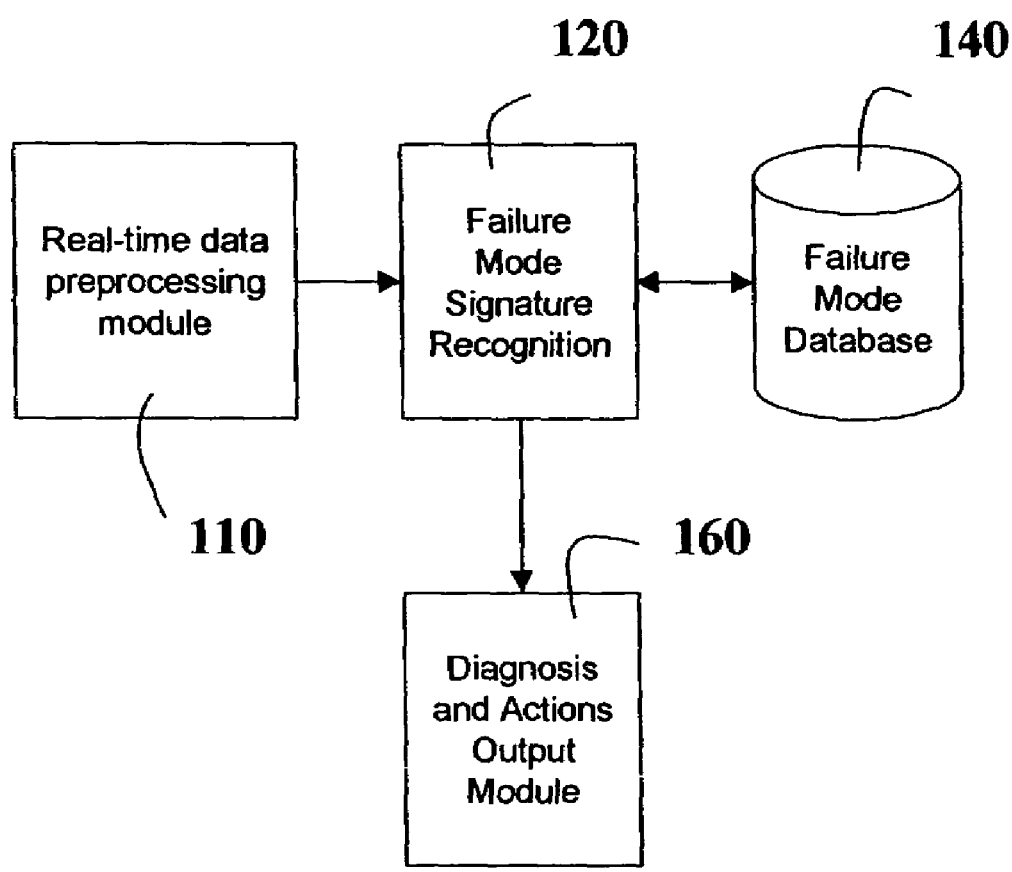
FIG. 1 shows a general arrangement for failure mode signature recognition using a database to identify likely failure modes from alert signals or residuals in accordance with the invention.

Turning now to the drawings, and particularly FIG. 1, the preferred embodiment of the invention is set forth generally, in which a real-time data preprocessing module 110 carries out monitoring operations on sensor data from a monitored machine or process, and outputs transformed data to a failure mode signature recognition module 120. The transformed data can be alert patterns, residuals, and the like, derived from normal monitoring activities of the module 110. The recognition module 120 is connected to a failure mode database 140, which contains signatures of transformed data and associated failure mode information. For example, if the transformed data is residual information, a signature can comprise a plurality of residual snapshots that are known to show themselves prior to that particular failure mode, and the associated failure mode information can comprise a description of the failure mode, a likelihood, an action plan for investigating the failure mode, or a corrective plan to fix the incipient failure. When signatures from database 140 are recognize by module 120, the associated identification and any corrective actions that should be taken are output in the failure mode diagnosis and actions output module 160, which can communicate this to a display, or present the information in an object-based environment for automated action by a downstream control system or the like.

The data preprocessing module can be any type of monitoring system, typically model-based, and more preferably empirical model-based, and most preferably non-parametric empirical model-based. In particular, kernel-based non-parametric models are preferred. In contrast to "first principle" modeling methods, there is no need to determine the equations of the physics that govern the monitored system. In contrast to parametric methods, which assume the "form" or equation type for a model of the monitored system and then fit the assumed form to empirical data by setting fitting parameters, a non-parametric model essentially reconstitutes the model "on-the-fly" using the input observation, making it much more data-driven and easier to use. This is best understood with reference to FIG. 2, which illustrates a prior art empirical model-based monitoring system, such as that described in the aforementioned patent to Gross et al. Therein is shown a machine or process 210 instrumented with sensors 215 that have data acquisition means associated with them to provide the sensor data to any number of computing systems. A reference library 230 of data characterizing the known or recognized states of operation of the machine or process is provided. The reference library 230 can reside in chip memory, or can be stored on a computer disk storage device. An estimation model 240 is implemented preferably in a computer as software, and receives sensor data from sensors 215 via a network or a data acquisition board. The estimation model 240 generates estimates of the sensor values in response to receiving the real-time values from sensors 215, using the reference library 230, as described in greater detail below. A differencing unit 250 receives both the estimates of the sensor values and the actual values and generates a residual for each sensor. Over successive snapshots, these residuals comprise residual signals that, as described above, should remain in the vicinity of zero with the exception of sensor and process noise, if the machine or process is operating normally (as characterized in the reference library data). A SPRT module 260 receives the residuals and generates alerts if the residuals show definitive evidence of being other than zero. Therefore, the outputs of this prior art system include residual signals and SPRT alerts (which are really indications of difference), and one of each is provided for each sensor on the machine or process that is monitored.

Figure 2:
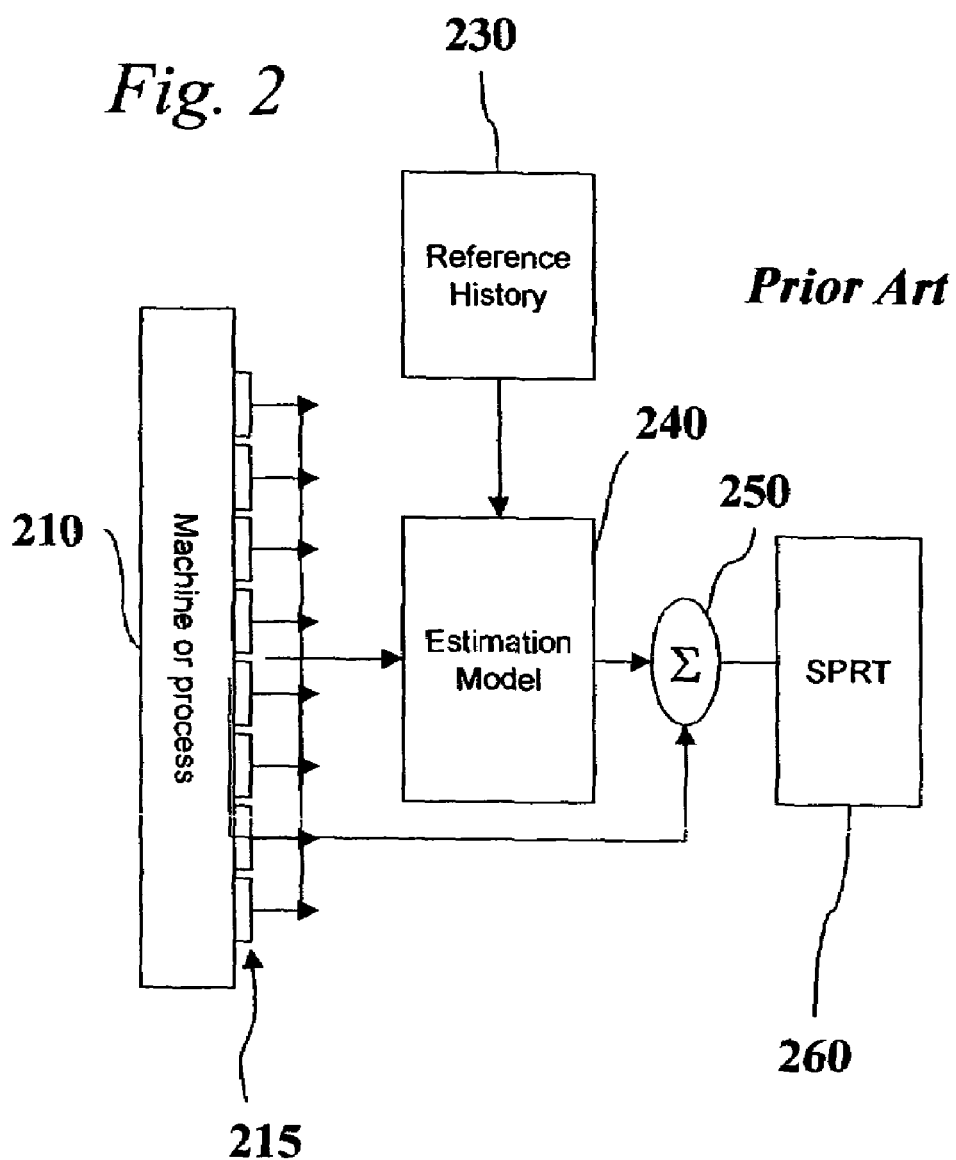
FIG. 2 shows a prior art empirical model-based monitoring system with SPRT alert module.
Figure 3:
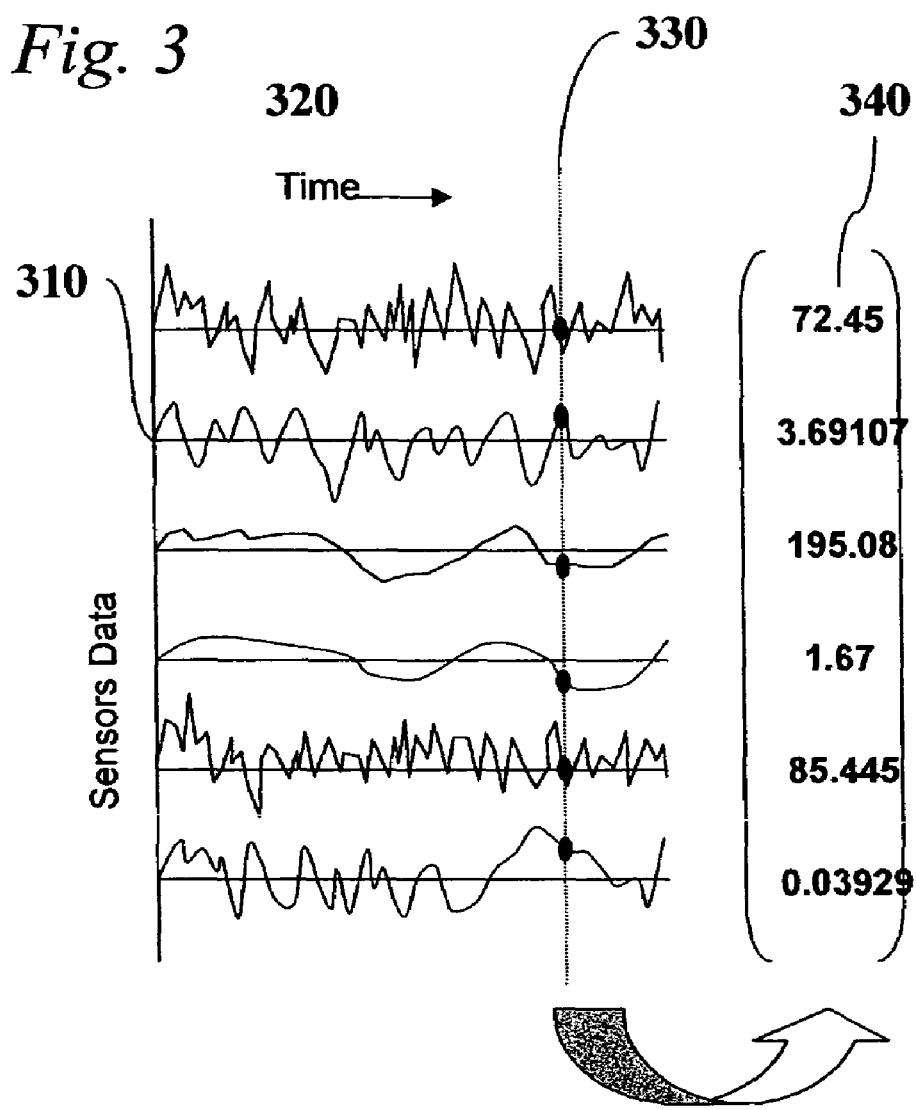
FIG. 3 shows a set of sensor signals, and the time-correlated sense of a "snapshot"

Turning to FIG. 3, the operation of the prior art system shown in FIG. 2 can further be understood in view of the multiple real-time sensor signals depicted therein. The vertical axis 310 is a composite axis for the six sensor signals shown, and represents the signal amplitude. Axis 320 is the time axis. The sensor signals in virtually all current industrial settings are sampled digitally, and are thus a sequence of discrete values, and a "snapshot" 330 can be made at a point in time, which really represents a set of values 340 for each of the six sensors, each value representing the sensor amplitude at that time. Of course, in some industrial processes and machines, there is a time delay between cause and effect among sensors measuring physically correlated parameters of the process, and a time adjustment can be added to the data such that the snapshot 330 represents time-correlated, but not necessarily simultaneous, readings.

Figure 4:
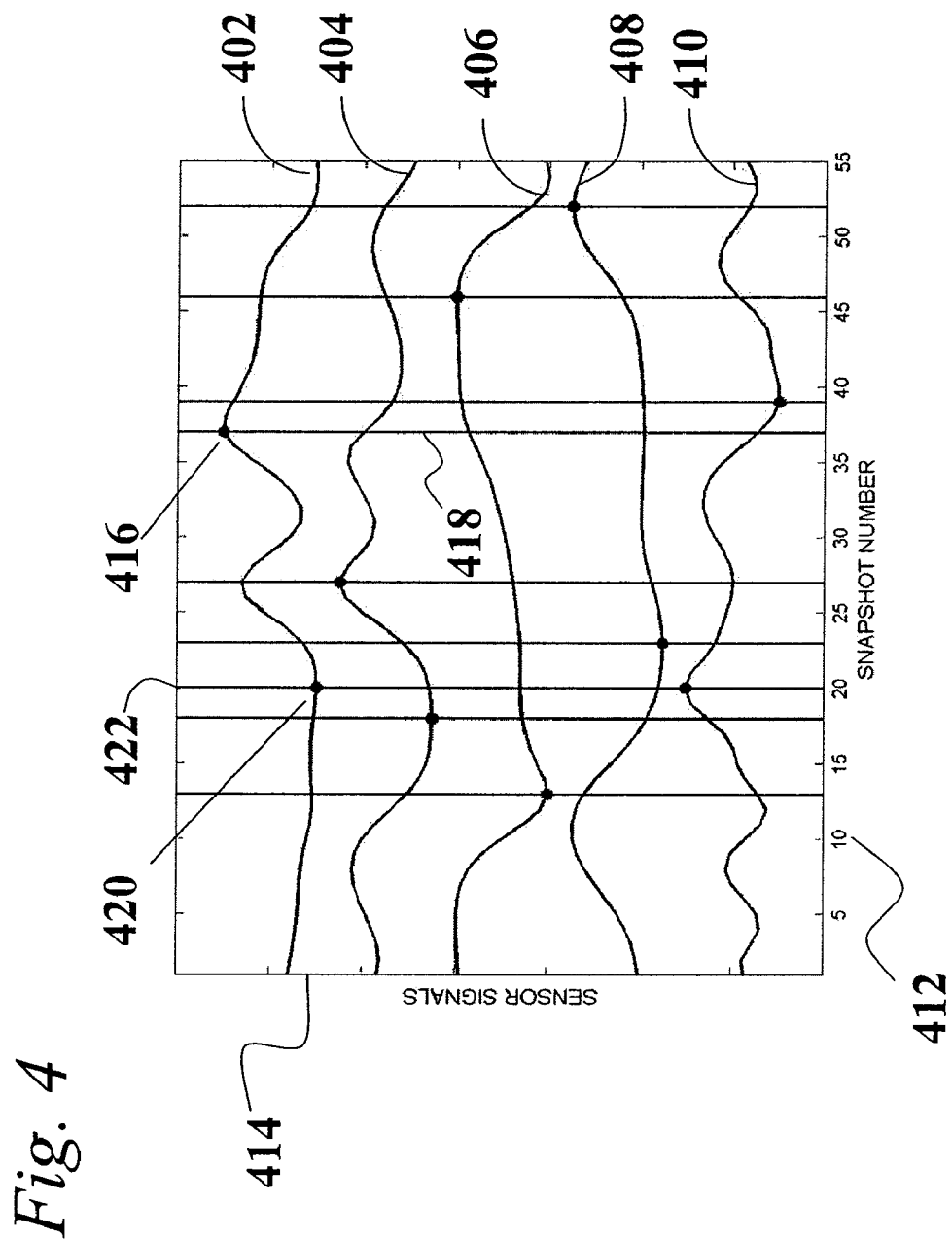
FIG. 4 is a chart showing a training method for an empirical model for use in the invention.

An empirical model-based monitoring system for use in the present diagnostic invention requires historic data from which to "learn" normal states of operation, in order to generate sensor estimates. Generally, a large amount of data is accumulated from an instrumented machine or process running normally and through all its acceptable dynamic ranges. The large set of representative data can be used for modeling, or in the interests of computational speed, the large set can be down-sampled to contain a subset of observations characteristic of the operational states, through a "training" process. Characteristic observations may also be determined from the large set by clustering methods of determining average observations, or "centers". A method for selecting training set snapshots is graphically depicted in FIG. 4, for distilling the collected sensor data to create a representative training data set. In this simple example, five sensor signals 402, 404, 406, 408 and 410 are shown for a process or machine to be monitored. Although the sensor signals 402, 404, 406, 408 and 410 are shown as continuous, typically, these are discretely sampled values taken at each snapshot. As indicated hereinabove, snapshots need not be ordered in any particular order and so, may be ordered in chronological order, parametric ascending or descending order or in any other selected order. Thus, the abscissa axis 412 is the sample number or time stamp of the collected sensor data, where the data is digitally sampled and the sensor data is temporally correlated. The ordinate axis 414 represents the relative magnitude of each sensor reading over the samples or "snapshots."

In this example, each snapshot represents a vector of five elements, one reading for each sensor in that snapshot. Of all the collected sensor data from all snapshots, according to this training method, only those five-element snapshots are included in the representative training set that contain either a global minimum or a global maximum value for any given sensor. Therefore, the global maximum 416 for sensor 402 justifies the inclusion of the five sensor values at the intersections of line 418 with each sensor signal 402, 404, 406, 408, 410, including global maximum 416, in the representative training set, as a vector of five elements. Similarly, the global minimum 420 for sensor 402 justifies the inclusion of the five sensor values at the intersections of line 422 with each sensor signal 402, 404, 406, 408, 410. Collections of such snapshots represent states the system has taken on. The pre-collected sensor data is filtered to produce a "training" subset that reflects all states that the system takes on while operating "normally" or "acceptably" or "preferably." This training set forms a matrix, having as many rows as there are sensors of interest, and as many columns (snapshots) as necessary to capture all the acceptable states without redundancy.

Figure 5:
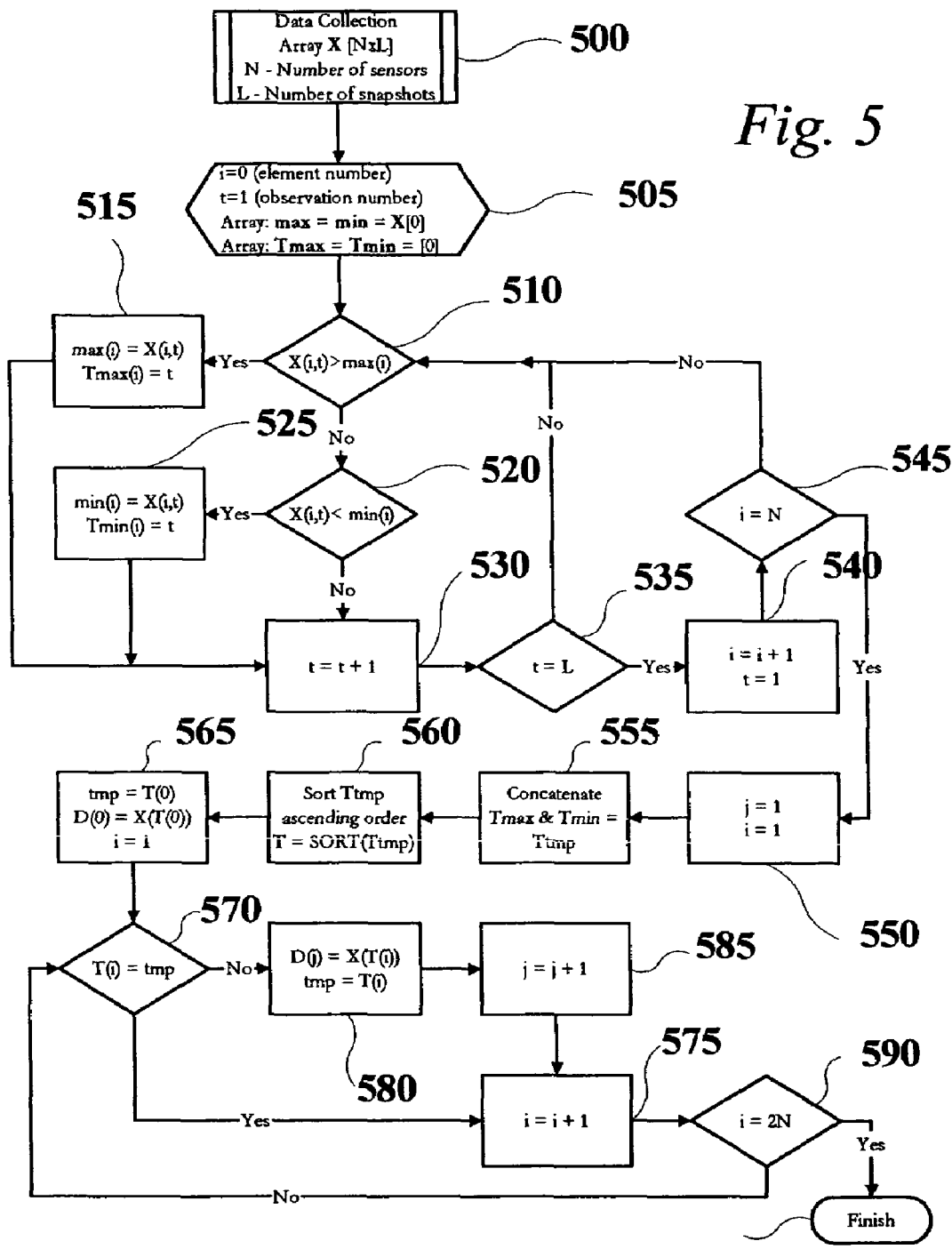
FIG. 5 is a flowchart of the subject training method of FIG. 4.

Selection of representative data is further depicted in the flow chart of FIG. 5. Data collected in Step 500 has N sensors and L observations or snapshots or temporally related sets of sensor data that comprise Array X of N rows and L columns. In Step 505, counter i (representing the element or sensor number) is initialized to zero, and observation or snapshot counter, t, is initialized to one. Moreover, Arrays max and min (containing maximum and minimum values, respectively, across the collected data for each sensor) are initialized to be vectors each of N elements which are set equal to the first column of X. Additional Arrays Tmax and Tmin (holding the observation number of the maximum and minimum value seen in the collected data for each sensor) are initialized to be vectors each of N elements, all zero.

In Step 510, if the sensor value of sensor i at snapshot t in X is greater than the maximum yet seen for that sensor in the collected data, max(i) is updated and set to equal the sensor value, while Tmax(i) stores the number t of the observation, as shown in Step 515. If the sensor value is not greater than the maximum, a similar test is done for the minimum for that sensor, as illustrated in Steps 520 and 525. The observation counter t is then incremented in Step 530. As shown in Step 535, if all the observations have been reviewed for a given sensor (i.e., when the observation counter t equals the number of snapshots, L) then the observation counter t is reset to one and the counter i is incremented, as shown in Step 540. At this point, the program continues to Step 510 to find the maximum and minimum for the next sensor. Once the last sensor has been finished, at which point i=n, as shown in Step 545, then any redundancies are removed and an array D is created from a subset of vectors from Array X. This creation process is discussed below.

In Step 550, counters i and j are both initialized to one. As illustrated by Step 555, arrays Tmax and Tmin are concatenated to form a single vector Ttmp. Preferably, Ttmp has 2N elements, sorted into ascending (or descending) order, as shown in Step 560 to form Array T. As shown in Step 565, holder tmp is set to the first value in T (an observation number that contains a sensor minimum or maximum). Additionally, the first column of Array D is set to be equal to the column of Array X corresponding to the observation number that is the first element of T. In the loop starting with the decision box of Step 570, the ith element of T is compared to the value of tmp that contains the previous element of T. If they are equal (i.e., the corresponding observation vector is a minimum or maximum for more than one sensor), that vector has already been included in Array D and need not be included again. Counter i is then incremented, as shown in Step 575. If the comparison is not equal, Array D is updated to include the column from X that corresponds to the observation number of T(i), as shown in Step 580, and tmp is updated with the value at T(i). Counter j is then incremented, as shown in Step 585, in addition to counter i (Step 575). In Step 590, if all the elements of T have been checked, and counter i equals twice the number of elements, N, then the distillation into training set or Array D has finished.

Signal data may be gathered from any machine, process or living system that is monitored with sensors. Ideally, the number of sensors used is not a limiting factor, generally, other than concerning computational overhead. Moreover, the methods described herein are highly scalable. However, the sensors should capture at least some of the primary "drivers" of the underlying system. Furthermore, all sensors inputted to the underlying system should be interrelated in some fashion (i.e., non-linear or linear).

Preferably, the signal data appear as vectors, with as many elements as there are sensors. A given vector represents a "snapshot" of the underlying system at a particular moment in time. Additional processing may be done if it is necessary to insert a "delay" between the cause and effect nature of consecutive sensors. That is, if sensor A detects a change that will be monitored by sensor B three "snapshots" later, the vectors can be reorganized such that a given snapshot contains a reading for sensor A at a first moment, and a reading for sensor B three moments later.

Further, each snapshot can be thought of as a "state" of the underlying system. Thus, collections of such snapshots preferably represent a plurality of states of the system. As described above, any previously collected sensor data can be filtered to produce a smaller "training" subset (the reference set D) that characterizes all states that the system takes on while operating "normally" or "acceptably" or "preferably." This training set forms a matrix, having as many rows as there are sensors of interest, and as many columns (snapshots) as necessary to capture the acceptable states without redundancy. The matrix can be determined offline as part of model training, or can even be done on-line, prior to rendering estimates for any particular input observation, and may be determined in part on the basis of characteristics of the input observation.

According to a preferred form of the invention, a non-parametric modeling approach is used that is uniquely capable of rendering estimates of variables of a complex system in operation, thus providing unique residuals and alerts between the actual values and the estimates. More preferably, a kernel-based non-parametric approach is used where a function, or "kernel", is used to combine learned observations in a weighted fashion based on the input observation to generate model results. The similarity-based approach is a kernel-based non-parametric model, capable of rendering useful estimates over a wide range of operation in contrast to parametric approaches like linear regression or neural networks, which tend to be only locally accurate. Kernel regression provides another kernel-based non-parametric estimator for use in the invention. Using a non-parametric model provides for purely data-driven modeling which avoids an investment in first-principles modeling and in tuning parametric estimators (such as neural networks), and provides for novel residual and alert precursors of failures for diagnostic purposes. A suitable kernel-based non-parametric model for use in the present invention is generally described by the equation:

$$\vec{Y}_{estimated} = \vec{C} \cdot \vec{K}(\vec{X}_{in}, \overline{D}) \tag{A}$$

where estimated sensor readings $Y_{estimated}$ are determined from the results of the kernel function K operating on the input observation vector $X_{in}$ and the set of learned observations in D, weighted according to some weight matrix C. In an alternative form, the kernel responses can be normalized to account for non-normalized data:

$$\vec{Y}_{estimated} = \vec{C} \cdot \frac{\vec{K}(\vec{X}_{in}, \overline{D})}{M} \tag{B}$$

where M is some normalization factor.

According to the similarity operator-based empirical modeling technique, for a given set of contemporaneous sensor data from the monitored process or machine running in real-time, the estimates for the sensors can be generated according to:

$$\vec{Y}_{estimated} = \overline{D} \cdot \vec{W} \tag{1}$$

where the vector Y of estimated values for the sensors is equal to the contributions from each of the snapshots of contemporaneous sensor values arranged to comprise matrix D (the reference library or reference set). These contributions are determined by weight vector W (not to be confused with weights C in equations A and B above). The multiplication operation is the standard matrix/vector multiplication operator. The vector Y has as many elements as there are sensors of interest in the monitored process or machine. W has as many elements as there are reference snapshots in D. W is determined by:

$$\vec{W} = \frac{\hat{\vec{W}}}{\left(\sum_{j=1}^{N} \hat{W}(j)\right)} \quad (2)$$

$$\hat{\vec{W}} = (\overline{D}^T \otimes \overline{D})^{-1} \cdot (\overline{D}^T \otimes \vec{Y}_{in}) \quad (3)$$

or in terms of equation B:

$$\vec{Y}_{estimated} = \left[\overline{D} \cdot (\overline{D}^T \otimes \overline{D})^{-1}\right] \cdot \left[\frac{(\overline{D}^T \otimes \vec{Y}_{in})}{\sum_{j=1}^{N} \hat{W}(j)}\right] \quad (3A)$$

$$\vec{Y}_{estimated} = [\overline{C}] \cdot \left[\frac{\vec{K}(\vec{Y}_{in}, \overline{D})}{M}\right] \quad (3B)$$

where the T superscript denotes transpose of the matrix, and $Y_{in}$ is the current snapshot of actual, real-time sensor data. The similarity operator is symbolized in Equation 3, above, as the circle with the "X" disposed therein. Moreover, D is again the reference library as a matrix, and $D^T$ represents the standard transpose of that matrix (i.e., rows become columns). $Y_{in}$ is the real-time or actual sensor values from the underlying system, and therefore is a vector snapshot. As mentioned above, the step of normalizing the W values in Equation 2 can be performed to improve modeling when the input data and training data have not been converted to normalized ranges. Furthermore, the similarity-based modeling approach can be used in an inferential mode, where estimates are made for variables which are not present as inputs, or the autoassociative case, where estimates are made for the inputs. In the inferential case, the D matrix can be separated into two parts, the first part of which corresponds to the inputs and is used in the kernel K, and the second part of which corresponds to the inferred variables and is in the numerator of C.

As stated above, the symbol $\otimes$ represents the "similarity" operator, and can be chosen from a wide variety of operators for use in the present invention. Preferably, the similarity operation used in the present invention should provide a quantified measure of likeness or difference between two state vectors, and more preferably yields a number that approaches one (1) with increasing sameness, and approaches zero (0) with decreasing sameness. In the context of the invention, this symbol should not to be confused with the normal meaning of designation of $\otimes$, which is something else. In other words, for purposes of the present invention the meaning of $\otimes$ is that of a "similarity" operation.

Generally, similarity as used herein is best understood to be a vector-to-vector comparison that reaches a highest value of one when the vectors are identical and are separated by zero distance, and diminishes as the vectors become increasingly distant (different). In general, the following guidelines help to define similarity operators:

1. Similarity is a scalar range, bounded at each end.
2. The similarity of two identical inputs is the value of one of the bounded ends.
3. The absolute value of the similarity increases as the two inputs approach being identical.

Accordingly, for example, an effective similarity operator for use in the present invention can generate a similarity of ten (10) when the inputs are identical, and a similarity that diminishes toward zero as the inputs become more different. Alternatively, a bias or translation can be used, so that the similarity is 12 for identical inputs, and diminishes toward 2 as the inputs become more different. Further, a scaling can be used, so that the similarity is 100 for identical inputs, and diminishes toward zero with increasing difference. Moreover, the scaling factor can also be a negative number, so that the similarity for identical inputs is −100 and approaches zero from the negative side with increasing difference of the inputs. The similarity can be rendered for the elements of two vectors being compared, and summed, averaged or otherwise statistically combined to yield an overall vector-to-vector similarity, or the similarity operator can operate on the vectors themselves (as in Euclidean distance).

The similarity operator, $\otimes$, works much as regular matrix multiplication operations, on a row-to-column basis. The similarity operation yields a scalar value for each pair of corresponding nth elements of a row and a column, and an overall similarity value for the comparison of the row to the column as a whole. This is performed over all row-to-column combinations for two matrices (as in the similarity operation on D and its transpose above).

By way of example, one similarity operator that can be used compares the two vectors (the ith row and jth column) on an element-by-element basis. Only corresponding elements are compared, e.g., element (i,m) with element (m,j) but not element (i,m) with element (n,j). For each such comparison, the similarity is equal to the absolute value of the smaller of the two values divided by the larger of the two values.

Hence, if the values are identical, the similarity is equal to one, and if the values are grossly unequal, the similarity approaches zero. When all the elemental similarities are computed, the overall similarity of the two vectors is equal to the average of the elemental similarities. A different statistical combination of the elemental similarities can also be used in place of averaging, e.g., median.

Figure 6:
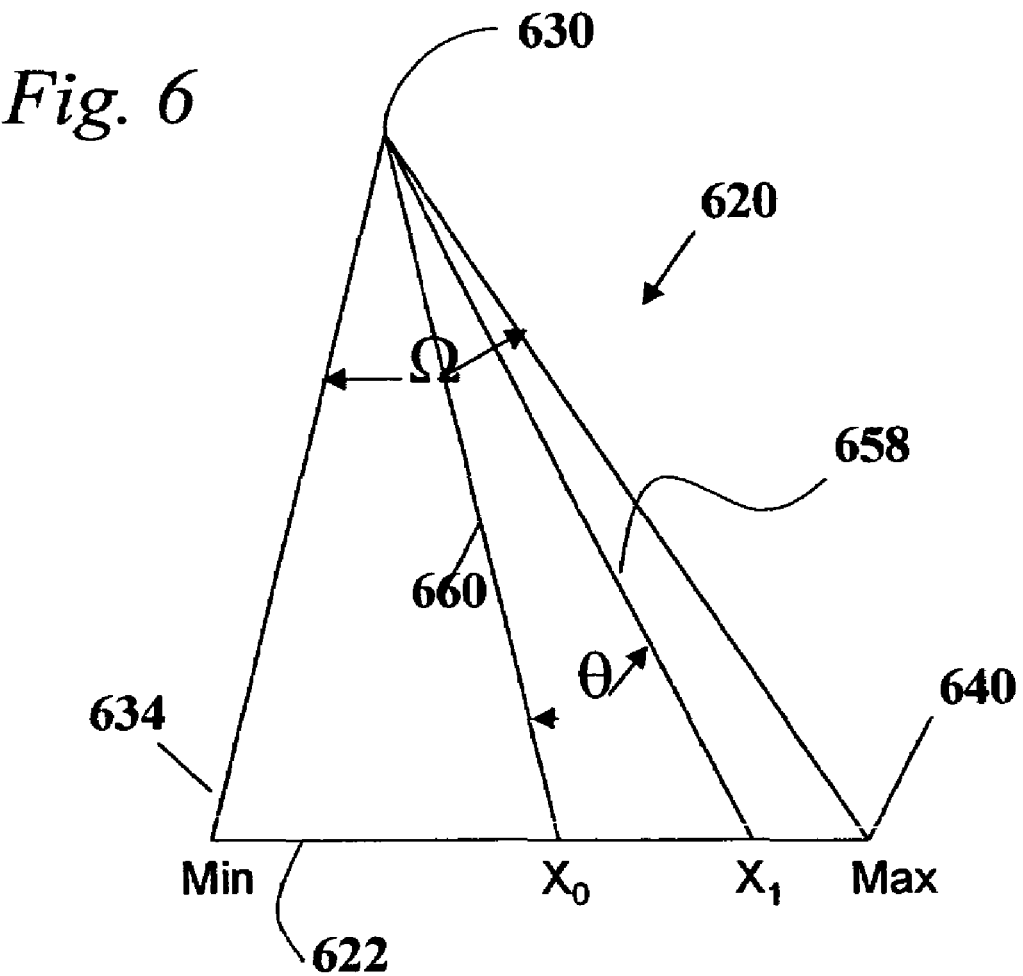
FIG. 6 illustrates a similarity operator that may be used for empirical modeling in a similarity engine with the present invention.

Another example of a similarity operator that can be used can be understood with reference to FIG. 6. With respect to this similarity operator, the teachings of U.S. Pat. No. 5,987,399 to Wegerich et al., co-pending U.S. application Ser. No. 09/795,509 to Wegerich et al., and co-pending U.S. application Ser. No. 09/780,561 to Wegerich et al. are relevant, and are incorporated herein by reference. For each sensor or physical parameter, a triangle 620 is formed to determine the similarity between two values for that sensor or parameter. The base 622 of the triangle is set to a length equal to the difference between the minimum value 634 observed for that sensor in the entire training set, and the maximum value 640 observed for that sensor across the entire training set. An angle Ω is formed above that base 622 to create the triangle 620. The similarity between any two elements in a snapshot-to-snapshot operation is then found by plotting the locations of the values of the two elements, depicted as $X_0$ and $X_1$ in the figure, along the base 622, using at one end the value of the minimum 634 and at the other end the value of the maximum 640 to scale the base 622.

Line segments 658 and 660 drawn to the locations of $X_0$ and $X_1$ on the base 622 form an angle θ. The ratio of angle θ to angle Ω gives a measure of the difference between $X_0$ and $X_1$ over the range of values in the training set for the sensor in question. Subtracting this ratio, or some algorithmically modified version of it, from the value of one yields a number between zero and one that is the measure of the similarity of $X_0$ and $X_1$.

Yet another example of a similarity operator that can be used determines an elemental similarity between two corresponding elements of two observation vectors or snapshots, by subtracting from one a quantity with the absolute difference of the two elements in the numerator, and the expected range for the elements in the denominator. The expected range can be determined, for example, by the difference of the maximum and minimum values for that element to be found across all the reference library data. The vector similarity is then determined by averaging the elemental similarities.

In yet another similarity operator that can be used in the present invention, the vector similarity of two observation vectors is equal to the inverse of the quantity of one plus the magnitude Euclidean distance between the two vectors in n-dimensional space, where n is the number of elements in each observation. In fact, with regard to vector similarity, the similarity of two observation vectors can be equal to a receptive field function h of the Euclidean norm, such as the Gaussian or exponentially localized function, or a linear function. The value of similarity drops off monotonically in all directions in n-space as the Euclidean norm between the two vectors grows, making each training vector in D a receptive field. This form of similarity-based modeling is known as a radial basis function network.

Elemental similarities are calculated for each corresponding pairs of elements of the two snapshots being compared. Then, the elemental similarities are combined in some statistical fashion to generate a single similarity scalar value for the vector-to-vector comparison. Preferably, this overall similarity, S, of two snapshots is equal to the average of the number N (the element count) of $s_c$ values:

$$S = \frac{\sum_{c=1}^{N} s_c}{N} \tag{4}$$

Other similarity operators are known or may become known to those skilled in the art, and can be employed in the present invention as described herein. The recitation of the above operators is exemplary and not meant to limit the scope of the claimed invention. The similarity operator is also used in this invention as described below for calculation of similarity values between snapshots of residuals and the diagnostic library of residual snapshots that belie an incipient failure mode, and it should be understood that the description above of the similarity operation likewise applies to the failure mode signature recognition using residuals.

Figure 7:
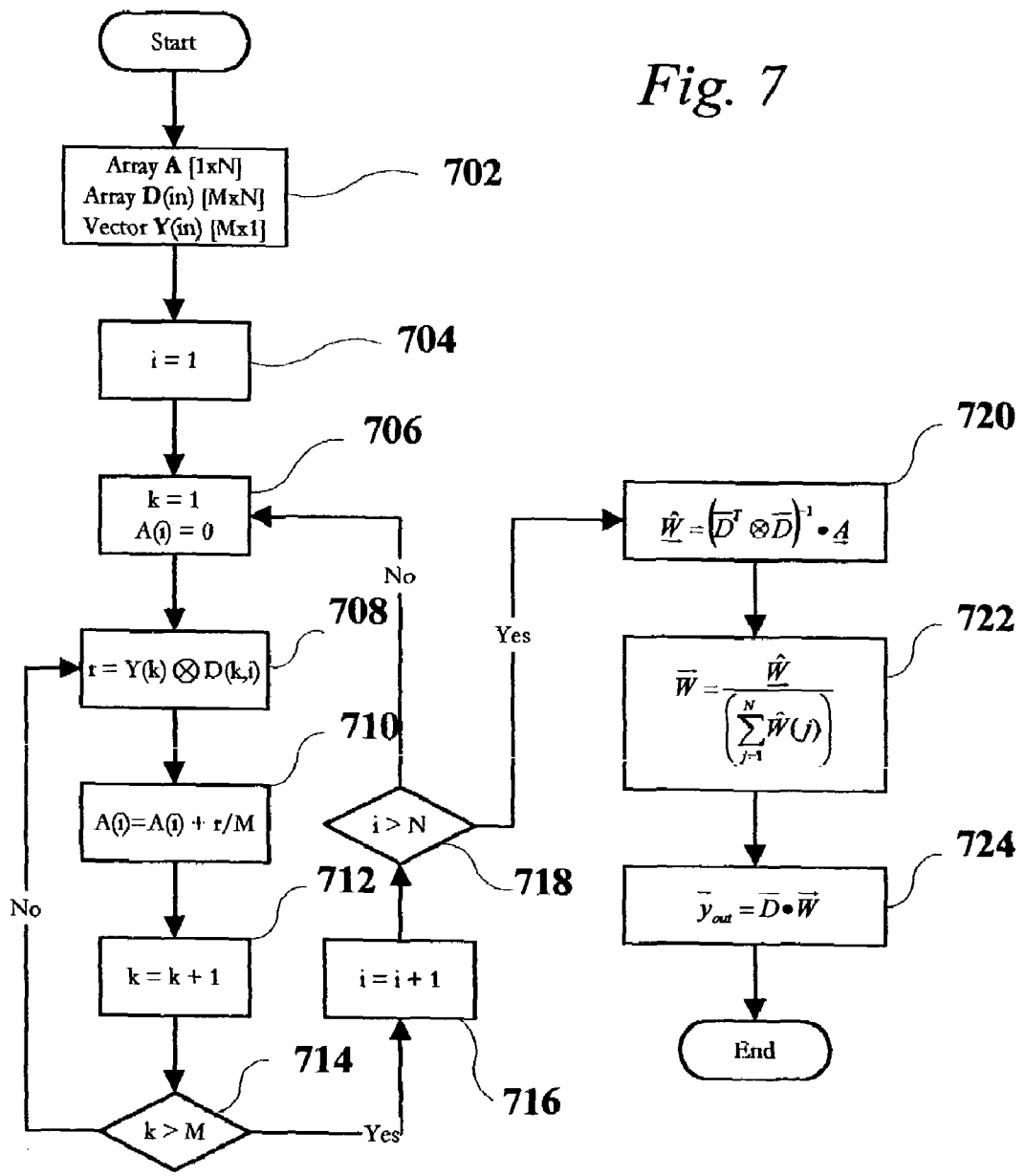
FIG. 7 is a flowchart for carrying out the similarity operation.

Turning to FIG. 7, the generation of estimates is further shown in a flowchart. Matrix D is provided in step 702, along with the input snapshot vector $y_{in}$ and an array A for computations. A counter i is initialized to one in step 704, and is used to count the number of observations in the training matrix D. In step 706, another counter k is initialized to one (used to count through the number of sensors in a snapshot and observation), and array A is initialized to contain zeroes for elements.

In step 708, the element-to-element similarity operation is performed between the kth element of $y_{in}$ and the (ith, kth) element in D. These elements are corresponding sensor values, one from actual input, and one from an observation in the training history D. The similarity operation returns a measure of similarity of the two values, usually a value between zero (no similarity) and one (identical) which is assigned to the temporary variable r. In step 710, r divided by the number of sensors M is added to the ith value in the one-dimensional array A. Thus, the ith element in A holds the average similarity for the elemental similarities of $y_{in}$ to the ith observation in D. In step 712, counter k is incremented.

In step 714, if all the sensors in a particular observation in D have been compared to corresponding elements of $y_{in}$, then k will now be greater than M, and i can be incremented in step 716. If not, then the next element in $y_{in}$ is compared for similarity to its corresponding element in D.

When all the elements of the current actual snapshot $y_{in}$ have been compared to all elements of an observation in D, a test is made in step 718 whether this is the last of the observations in D. If so, then counter i is now more than the number of observations N in D, and processing moves to step 720. Otherwise, it moves back to step 706, where the array A is reset to zeroes, and the element (sensor) counter k is reset to one. In step 720, a weight vector W-carrot is computed from the equation shown therein, where $\otimes$ represents a similarity operation, typically the same similarity operator as is used in step 708. In step 722 W-carrot is normalized using a sum of all the weight elements in W-carrot, which ameliorates the effects in subsequent steps of any particularly large elements in W-carrot, producing normalized weight vector W. In step 724, this is used to produce the estimated output $y_{out}$ using D.

Another example of a kernel-based non-parametric empirical modeling method that can be used in the present invention to generate estimates of the process or machine being monitored is kernel regression, or kernel smoothing. A kernel regression can be used to generate an estimate based on a current observation in much the same way as the similarity-based model, which can then be used to generate a residual as detailed elsewhere herein. Accordingly, the following Nadaraya-Watson estimator can be used:

$$\hat{y} = (\vec{X}, h) = \frac{\sum_{i=1}^{n} K_h(\vec{X} - \vec{X}_i) y_i}{\sum_{i=1}^{n} K_h(\vec{X} - \vec{X}_i)} \tag{13}$$

where in this case a single scalar inferred parameter y-hat is estimated as a sum of weighted exemplar $y_i$ from training data, where the weight it determined by a kernel K of width h acting on the difference between the current observation X and the exemplar observations $X_i$ corresponding to the $y_1$ from training data. The independent variables $X_i$ can be scalars or vectors. Alternatively, the estimate can be a vector, instead of a scalar:

$$\vec{Y}_{estimated}(\vec{X}, h) = \frac{\sum_{i=1}^{n} K_h(\vec{X} - \vec{X}_i) \vec{Y}_i}{\sum_{i=1}^{n} K_h(\vec{X} - \vec{X}_i)} \tag{14}$$

Here, the scalar kernel multiplies the vector $Y_i$ to yield the estimated vector. Put into terms of equation A above:

$$\vec{Y}_{estimated}(\vec{X}, h) = \left[ \frac{\overline{Y}_D}{\sum_{i=1}^{n} K_h(\vec{X}, \vec{X}_i)} \right] \cdot \left[ K_h(\vec{X}, \overline{X}_D) \right] \tag{14A}$$

$$\vec{Y}_{estimated}(\vec{X}, h) = [\overline{C}] \cdot \left[ \vec{K}_h(\vec{X}, \overline{X}_D) \right] \quad (14B)$$

where matrix $Y_D$ is the collection of learned output observations $Y_i$ and matrix $X_D$ is the collection of learned input observations $X_i$.

A wide variety of kernels are known in the art and may be used. One well-known kernel, by way of example, is the Epanechnikov kernel:

$$K_h(u) = \begin{cases} \frac{3}{4h}(1 - u^2/h^2); & |u| \le h \\ 0; & |u| > h \end{cases} \quad (15)$$

where h is the bandwidth of the kernel, a tuning parameter, and u can be obtained from the difference between the current observation and the exemplar observations as in Equation 13. Another kernel of the countless kernels that can be used in remote monitoring according to the invention is the common Gaussian kernel (like the Gaussian kernel of the abovementioned radial basis function):

$$K_h(\vec{X} - \vec{X}_i) = \frac{1}{\sqrt{2}} e^{-\frac{(\vec{x} - \vec{x}_i)^2}{2}} \quad (16)$$

Figure 8A:
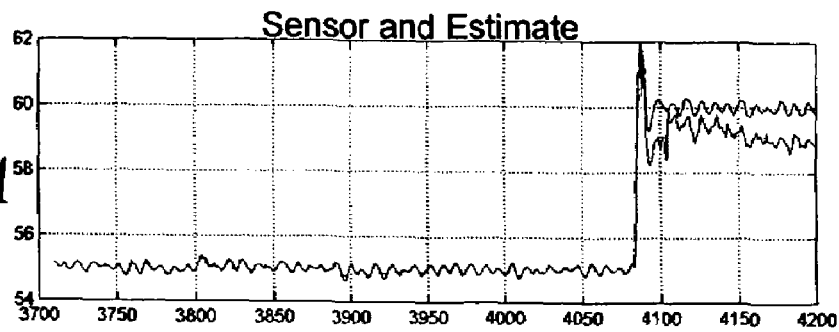
FIGS. 8A-8D illustrate for a single sensor the actual sensor signal, estimate, alert index and alert decisions according to the monitoring system for use in the present invention.
Figure 8B:
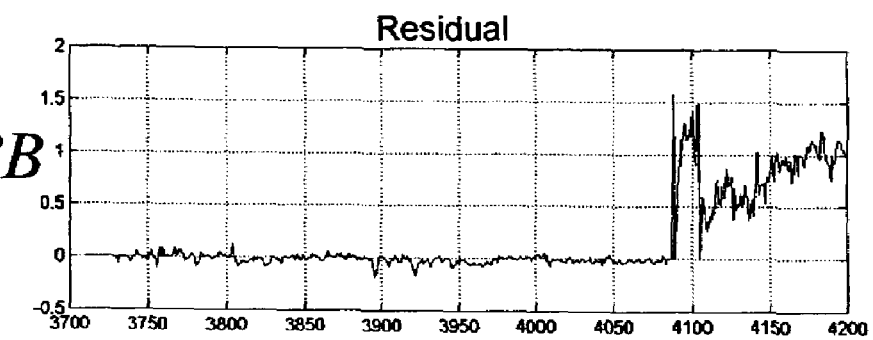
Figure 8C:
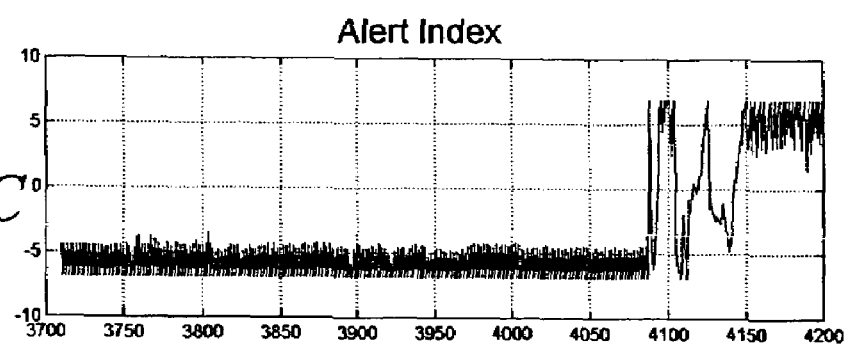
Figure 8D:
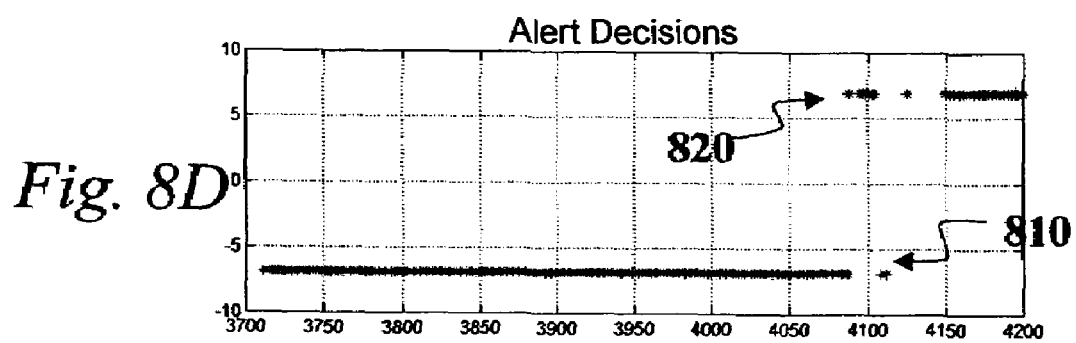

Examples of various preprocessed data that can be used for diagnostics as a consequence of monitoring the process or machine as described in detail herein are shown in connection with FIGS. 8A-8D. FIG. 8A shows both the actual signal and the estimated signal for a given sensor, one of potentially many sensors that are monitored, modeled and estimated in the estimation model 240 from FIG. 2. FIG. 8B shows the resulting residual signal from differencing the signals in FIG. 8A, as is done in the differencing module 250 of FIG. 2. As can be seen on examination of FIG. 8B, the sensor residual takes on a series of non-zero values that lead to the eventual failure. In another failure mode, the series of values taken on may be different, such that the residuals for all the sensors in the monitored system contain information for differentiating the onset of one kind of failure from another, which is essentially a first step in diagnostics. The alert index of FIG. 8C and the alert decisions of FIG. 8D are discussed below, but also provide information that can be used to diagnose an impending failure. In FIG. 8D, each asterisk on the bottom line 810 indicates a decision for a given input snapshot that for this sensor, the actual and the estimated value are the same. Asterisks on the top line 820 indicate a point in the series of snapshots for which the estimate for this sensor and the actual appear to have diverged.

One decision technique that can be used according to the present invention to determine whether or not to alert on a given sensor estimate is to employ thresholds for the residual for that sensor. Thresholds as used in the prior art are typically used on the gross value of a sensor, and therefore must be set sufficiently wide or high to avoid alerting as the measured parameter moves through its normal dynamic range. A residual threshold is vastly more sensitive and accurate, and is made possible by the use of the sensor value estimate. Since the residual is the difference between the actual observed sensor value and the estimate of that value based on the values of other sensors in the system (using an empirical model like the similarity engine described herein), the residual threshold is set around the expected zero-mean residual, and at a level potentially significantly narrower than the dynamic range of the parameter measured by that sensor. According to the invention, residual thresholds can be set separately for each sensor. The residual thresholds can be determined and fixed prior to entering real-time monitoring mode. A typical residual threshold can be set as a multiple of the empirically determined variance or standard deviation of the residual itself. For example, the threshold for a given residual signal can be set at two times the standard deviation determined for the residual over a window of residual data generated for normal operation. Alternatively, the threshold can be determined "on-the-fly" for each residual, based on a multiplier of the variance or standard deviation determined from a moving window of a selected number of prior samples. Thus, the threshold applied instantly to a given residual can be two times the standard deviation determined from the past hundred residual data values.

Another decision technique that can be employed to determine whether or not to alert on a given sensor estimate is called a sequential probability ratio test (SPRT), and is described in the aforementioned U.S. Pat. No. 5,764,509 to Gross et al. It is also known in the art, from the theory of Wald and Wolfowitz, "Optimum Character of the Sequential Probability Ratio Test", Ann. Math. Stat. 19, 326 (1948). Broadly, for a sequence of estimates for a particular sensor, the test is capable of deciding with preselected missed and false alarm rates whether the estimates and actuals are statistically the same or different, that is, belong to the same or to two different probability distributions.

The basic approach of the SPRT technique is to analyze successive observations of a sampled parameter. A sequence of sampled differences between the estimate and the actual for a monitored parameter should be distributed according to some kind of distribution function around a mean of zero. Typically, this will be a Gaussian distribution, but it may be a different distribution, as for example a binomial distribution for a parameter that takes on only two discrete values (this can be common in telecommunications and networking machines and processes). Then, with each observation, a test statistic is calculated and compared to one or more decision limits or thresholds. The SPRT test statistic generally is the likelihood ratio $l_n$, which is the ratio of the probability that a hypothesis $H_1$ is true to the probability that a hypothesis $H_0$ is true:

$$l_n = \frac{(y_1, y_2, \ldots, y_n | H_1)}{(y_1, y_2, \ldots, y_n | H_0)} \quad (5)$$

where $Y_n$ are the individual observations and $H_n$ are the probability distributions for those hypotheses. This general SPRT test ratio can be compared to a decision threshold to reach a decision with any observation. For example, if the outcome is greater than 0.80, then decide $H_1$ is the case, if less than 0.20 then decide $H_0$ is the case, and if in between then make no decision.

The SPRT test can be applied to various statistical measures of the respective distributions. Thus, for a Gaussian distribution, a first SPRT test can be applied to the mean and a second SPRT test can be applied to the variance. For example, there can be a positive mean test and a negative mean test for data such as residuals that should distribute around zero. The positive mean test involves the ratio of the likelihood that a sequence of values belongs to a distribution $H_0$ around zero, versus belonging to a distribution $H_1$ around a positive value, typically the one standard deviation above zero. The negative mean test is similar, except $H_1$ is around zero minus one standard deviation. Furthermore, the variance SPRT test can be to test whether the sequence of values belongs to a first distribution $H_0$ having a known variance, or a second distribution $H_2$ having a variance equal to a multiple of the known variance.

For residuals derived from known normal operation, the mean is zero, and the variance can be determined. Then in run-time monitoring mode, for the mean SPRT test, the likelihood that $H_0$ is true (mean is zero and variance is $\sigma^2$) is given by:

$$L(y_1, y_2, \ldots, y_n | H_0) = \frac{1}{(2\pi\sigma)^{n/2}} e^{\left[-\frac{1}{2\sigma^2} \sum_{k=1}^n y_k^2\right]} \tag{6}$$

and similarly, for $H_1$, where the mean is M (typically one standard deviation below or above zero, using the variance determined for the residuals from normal operation) and the variance is again $\sigma^2$ (variance is assumed the same):

$$L(y_1, y_2, \ldots, y_n | H_1) = \tag{7}$$

$$\frac{1}{(2\pi\sigma)^{n/2}} e^{\left[-\frac{1}{2\sigma^2} (\sum_{k=1}^n y_k^2 - 2\sum_{k=1}^n y_k M + \sum_{k=1}^n M^2)\right]}$$

The ratio $l_n$ from Equations 6 and 7 then becomes:

$$l_n = e^{\left[-\frac{1}{2\sigma^2} \sum_{k=1}^n M(M-2y_k)\right]} \tag{8}$$

A SPRT statistic can be defined for the mean test to be the exponent in Equation 8:

$$SPRT_{mean} = -\frac{1}{2\sigma^2} \sum_{k=1}^n M(M - 2y_k) \tag{9}$$

The SPRT test is advantageous because a user-selectable false alarm probability $\alpha$ and a missed alarm probability $\beta$ can provide thresholds against with $SPRT_{mean}$ can be tested to produce a decision:
1. If $SPRT_{mean} \leq \ln(\beta/(1-\alpha))$, then accept hypothesis $H_0$ as true;
2. If $SPRT_{mean} \geq \ln((1-\beta)/\alpha)$, then accept hypothesis H1 as true; and
3. If $\ln(\beta/(1-\alpha)) < SPRT_{mean} < \ln((1-\beta)/\alpha)$, then make no decision and continue sampling.

For the variance SPRT test, the problem is to decide between two hypotheses: $H_2$ where the residual forms a Gaussian probability density function with a mean of zero and a variance of $V\sigma^2$; and $H_0$ where the residual forms a Gaussian probability density function with a mean of zero and a variance of $\sigma^2$. The likelihood that $H_2$ is true is given by:

$$L(y_1, y_2, \ldots, y_n | H_2) = \frac{1}{(2\pi V^{1/2}\sigma)^{n/2}} e^{\left[-\frac{1}{2V\sigma^2} \sum_{k=1}^n y_k^2\right]} \tag{10}$$

The ratio $l_n$ is then provided for the variance SPRT test as the ratio of Equation 10 over Equation 6, to provide:

$$l_n = V^{-1/2} e^{\left[-\frac{1}{2\sigma^2} \sum_{k=1}^n y_k^2 (\frac{1-V}{V})\right]} \tag{11}$$

and the SPRT statistic for the variance test is then:

$$SPRT_{variance} = \frac{1}{2\sigma^2} \left(\frac{V-1}{V}\right) \sum_{k=1}^n y_k^2 - \frac{\ln V}{2} \tag{12}$$

Thereafter, the above tests (1) through (3) can be applied as above:
1. If $SPRT_{variance} \leq \ln(\beta/(1-\alpha))$, then accept hypothesis $H_0$ as true;
2. If $SPRT_{variance} \geq \ln((1-\beta)/\alpha)$, then accept hypothesis $H_2$ as true; and
3. If $\ln(\beta/(1-\alpha)) < SPRT_{variance} < \ln((1-\beta)/\alpha)$, then make no decision and continue sampling.

Each snapshot that is passed to the SPRT test module, can have SPRT test decisions for positive mean, negative mean, and variance for each parameter in the snapshot. In an empirical model-based monitoring system according to the present invention, any such SPRT test on any such parameter that results in an hypothesis other than $H_0$ being accepted as true, is effectively an alert on that parameter. Of course, it lies within the scope of the invention for logic to be inserted between the SPRT tests and the output alerts, such that a combination of a non-$H_0$ result is required for both the mean and variance SPRT tests in order for the alert to be generated for the parameter, or some other such rule.

In yet another form of preprocessed output from model estimation that can be used as input to the failure mode signature recognition module 120 of FIG. 1, a feature vector can be assembled representing the state of estimates, residuals and decisions for a given observation. Residuals can be "quantized" into severity levels, and combined with raw signal values or estimates, as well as alert decisions to form vectors which can be compared as described below using a similarity operation to the feature vectors that are known precursors to known failure modes. Quantization of residuals is useful in that the underlying raw signals from the observation of the monitored system can be noisy, as can the estimates from the model. These noise factors can make it difficult to identify a pattern in successive vectors of residuals. By quantizing the residuals, the progression of a fault can more readily be pattern-matched with known feature vectors of known failure modes.

For example, in a system to be monitored having 12 instrumented variables for modeling, residuals may be generated from the difference of the estimates and the raw signals for several of the 12 variables, and one or more of these may be quantized. Quantization may be based on multiples of the standard deviation in a window of the residual data for a given variable, for example in a window of 1000 samples which provides the standard deviation for that residual (which may be thereafter used as a fixed number), residuals less than one standard deviation can be assigned a quantized value of zero, residuals between one and three standard deviations can be assigned a quantized value of one (or negative one for negative residuals), residuals above three standard deviations can be assigned a quantized value of two. Quantization can also be based on multi-observation persistence, such that the quantization level assigned to the current residual observation variable is based on the median of the window of the last three residual observations, to obviate issues of extreme spiking.

Figure 9:
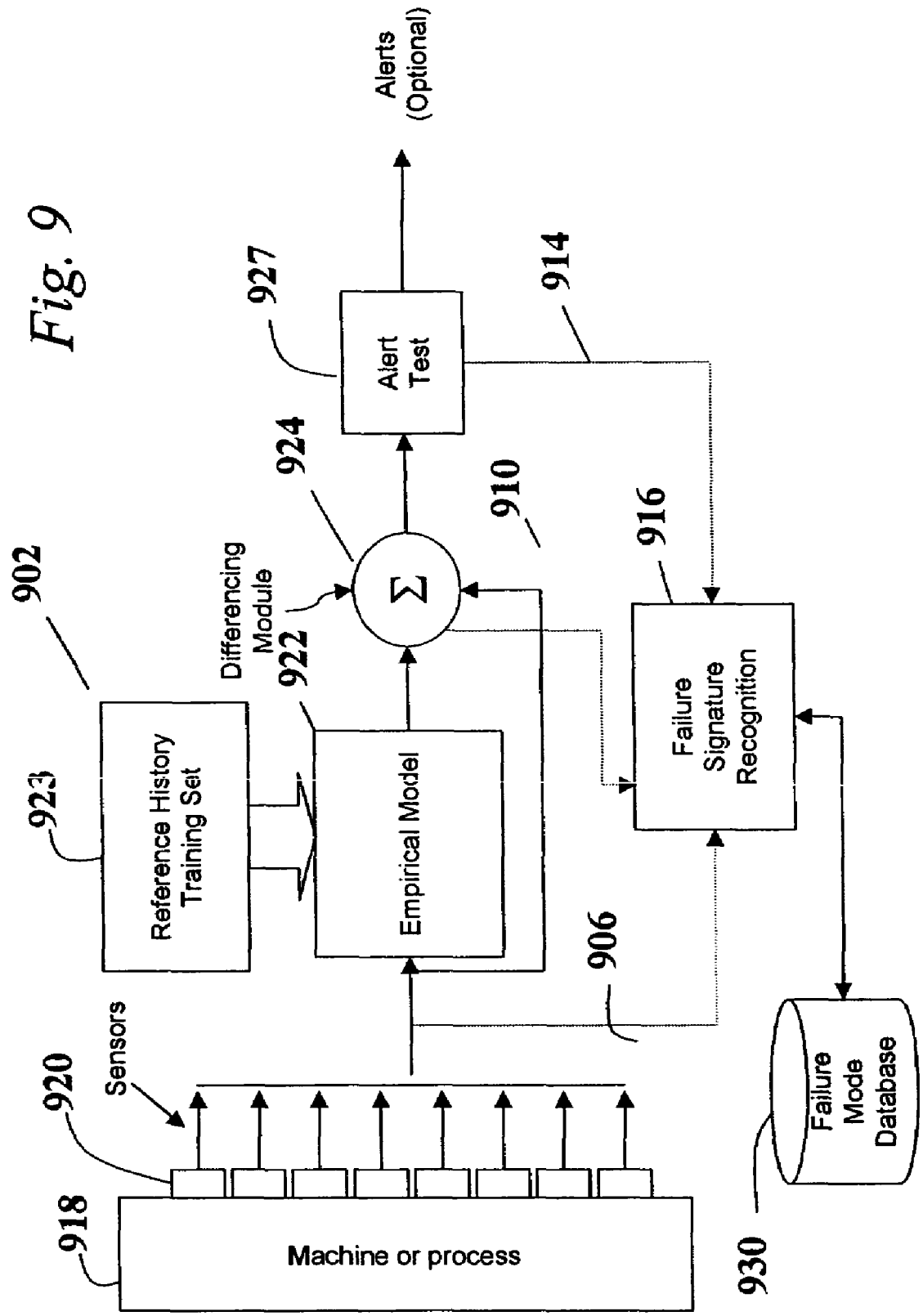
FIG. 9 illustrates a block diagram of a monitoring system according to the present invention, with three alternative avenues for using monitoring information for diagnostics.

Turning now to the diagnostic function coupled to the model-based monitoring system, depicted in FIG. 9 is the embodiment 902 showing the three alternative avenues 906, 910 and 914 for monitoring data to be passed to the failure signature recognition module 916 (dashed lines) for failure mode recognition. Therein is shown a machine or process of interest 918, instrumented with multiple sensors 920. The sensor data is passed (preferably in real time) to a model 922 (preferably empirical, with a reference library or training set 923) and also to a differencing module 924. The model 922 generates estimates that are compared to the actual sensor values in the differencing module 924 to generate residuals, which are passed to an alert test 927. The alert test 927 can be the SPRT, or can be residual threshold alerts as described above, or any other alert technique based on the residual. Alerts are generated on detection of deviations from normal, as described above. Alerts may optionally be output from the system in addition to any diagnostic information. Avenue 906 shows that actual sensor snapshots can be passed to the failure signature recognition module 916, such that the module 916 compares the actual snapshots to stored snapshots in the failure mode database 930, and upon sufficient match (as described below) the failure mode is output corresponding to that belied by the actual sensor snapshots. Avenue 910 represents the alternative embodiment, where residual snapshots (comprising usually near-zero values for each of the monitored sensors) are passed to the module 916, and are compared to stored snapshots of residuals that are known to precede recognized failure modes, and upon a match (as described below), the corresponding failure mode is output. In the third alternative, avenue 914 provides for feeding test alerts, more particularly SPRT alerts or residual threshold alerts from the test 927 to the module 916, which compares these, or a sequence of these over time, to SPRT or residual threshold alert patterns (as described below) stored in the database 930, and upon a match outputs the corresponding failure mode. As described elsewhere herein, the output of the failure mode can be a display or notification of one or more likely failure modes, investigative action suggestions, and resolution action suggestions, which are all stored in the database with the related failure mode signature. The inventive system also provides for the addition of new failure modes based on actual snapshots, residual snapshots, or alert patterns, by the user in the event none of the failure modes in the database 930 sufficiently match the precursor data to the failure. Thus three sources of data can be recognized for failure signatures are presented: 1) Actual sensor data coming from the machine or process of interest; 2) residual data coming from the differencing module; and 3) SPRT or alert test patterns.

In the generalized model of FIG. 1, a similarity engine may be employed for failure mode signature recognition (regardless of whether a similarity engine is used to do the initial modeling and estimate generation) that operates on either residual or actual signals using the database 140 to identify likely failure modes for automatic feedback control with associated probabilities of the failure modes. The signature recognition module 140 may be provided with historic data (actuals or residuals) of signatures leading up to historic failures of known mode. Failure mode recognition can execute in parallel with ongoing regular operation of the traditional similarity operator monitoring technology.

Figure 10:
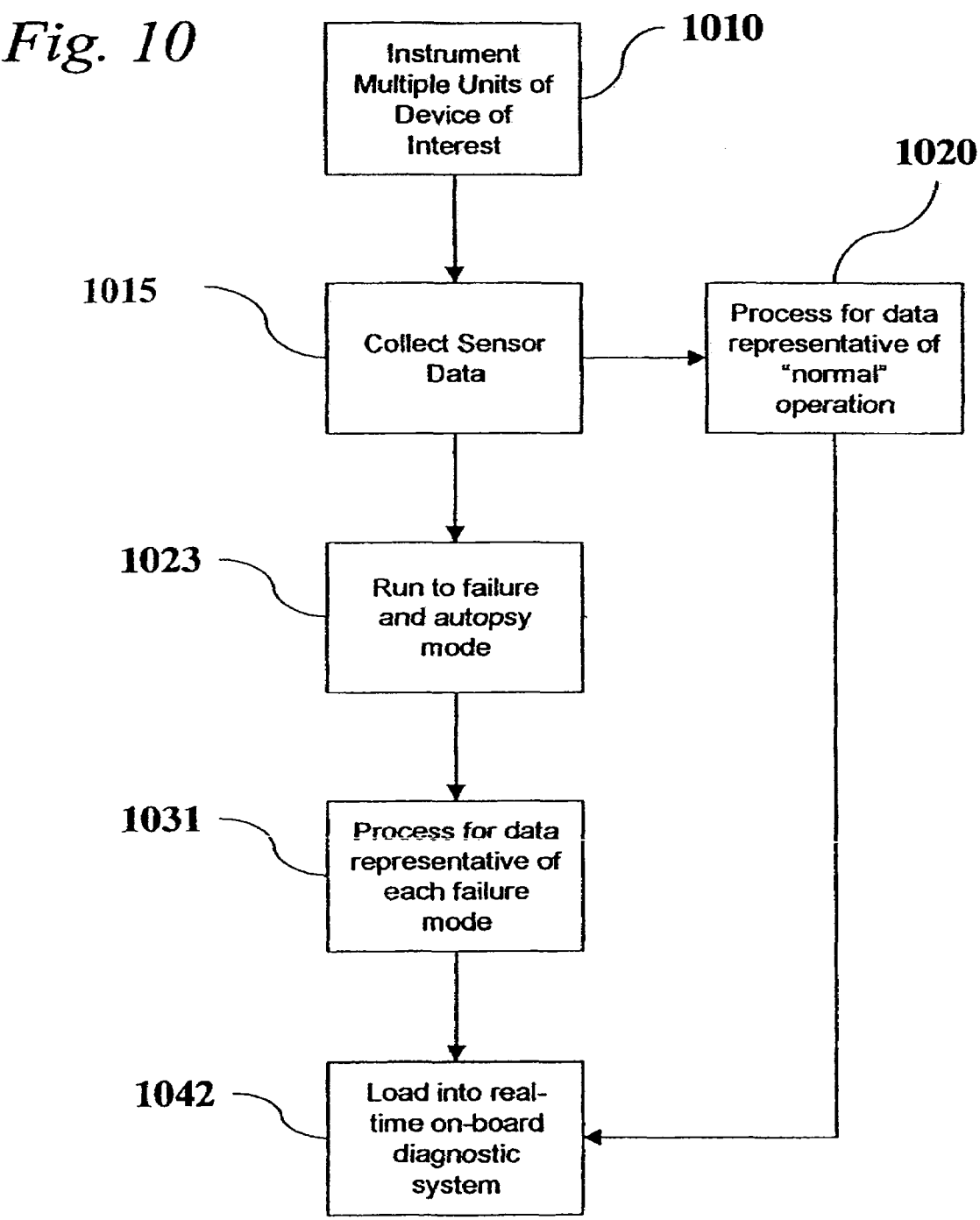
FIG. 10 is a flowchart for establishing a diagnostic library for a set of identical machines.

Turning to FIG. 10, an implementation method is shown for populating the failure mode database 930 of FIG. 9 (or database 140 of FIG. 1) with precursor data for signature matching, and associated probabilities and action suggestions, for application of the present invention to a production run of identical machines that are designed to have on-board self-diagnostic capabilities. An example of such a machine may be an instrumented electric motor. In step 1010, a plurality of the identical machines are instrumented with sensors as they would be in the field. These machines will be run to failure and ruined, in order to discover the various modes of failure of the machine design. Therefore, a sufficiently large number should be used to provide some statistical measure of the likelihood of each failure mode and to provide sufficient representative precursor data for each failure mode. In step 1015, data collection is performed as the instrumented machines are run through routine operational ranges. In step 1020, at least some of the data (preferably from early operation of the machines, before they begin to degrade) is captured for use in building the reference library for the empirical model, if that method of monitoring is to be used. In step 1023, the machines are all run to failure, and data is captured from the sensors as they fail.

In step 1031, the captured data is processed to isolate precursor data for each failure mode. Failure modes are selected by the user of the invention, and are logical groupings of the specific findings from autopsies of each machine failure. The logical groupings of autopsied results into "modes" of failure should be sensible, and should comport with the likelihood that the precursor data leading to that failure mode will be the same or similar each time. However, beyond this requirement, the user is free to group them as seen fit. Thus, for example, a manufacturer of an electric motor may choose to run 50 motors to failure, and upon autopsy, group the results into three major failure modes, related to stator problems, mechanical rotating pieces, and insulation winding breakdown. If these account for a substantial majority of the failure modes of the motor, the manufacturer may choose not to recognize other failure modes, and will accept SPRT or residual threshold alerts from monitoring with no accompanying failure mode recognition as essentially a recognition of some uncommon failure.

According to another method of the invention, commonly available analysis methods known to those in the art may be used to self-organize the precursor data for each instance of failure into logical groupings according to how similar the precursor data streams are. For example, if the user divines a distinct autopsy result for each of 50 failed motors, but analysis of the alerts shows that 45 of the failures clearly have one of three distinct alert patterns leading to failure (for example 12 failures in one pattern, 19 in another pattern and 14 in the third pattern, with the remaining 5 of the 50 belonging to and defining no recognized pattern), the three distinct patterns may be treated as failure modes. The user then must decide in what way the autopsy results match the failed modes, and what investigative and resolution actions can be suggested for the groups based thereon, and stored with the failure mode signature information.

For determining precursor diagnostic data in step 1031, the normal data of 1020 should be trained and distilled down to a reference library and used offline to generate estimates, residuals and alerts in response to input of the precursor data streams.

Finally, in step 1042, the diagnostic precursor signatures, the user input regarding failure mode groupings of those signatures and suggested actions, and the empirical model reference library (if an empirical model will be used) is loaded into the onboard memory store of a computing device accompanying each machine of the production run. Thus, a machine can be provided that may have a display of self-diagnostic results using the experience and empirical data of the autopsied failed machines.

Turning to FIG. 11, it may be desirable or necessary to begin with an empty failure mode database, and an implementation method for this is shown. For example, in the case of an industrial process having sensors, and to be retrofitted with the diagnostic system of the invention, it may not be feasible to cause the process to run to failure multiple times in order to collect precursor data and failure mode information. Alternatively, it may be desirable to initiate real-time monitoring of the process (or machine) with alerts, and add failure modes as they occur. In step 1153, the process is instrumented with sensors, if they are not already in place. In step 1157, sensor data is collected as before, and the process is operated normally. In step 1161, collected data is used to train a reference library for empirical modeling. In step 1165, the resulting reference library is loaded into the monitoring system, and in step 1170 the process is monitored in real time. Upon the occurrence of a failure (or a prevented failure handled due to incipient failure alerts) in step 1172, the failure (or prevented failure) is autopsied in step 1176. In step 1180, collected data (from a historian or other recording feature for operational data archiving) preceding the failure is retrieved and analyzed (as described below) in step 1183 to provide precursor residuals, alerts or actuals of the failure mode. The process operator is also prompted for failure mode information, and associated action suggestions to be stored in the failure mode database. Thus, diagnostic monitoring data on failures is collected and stored in the failure mode database, and becomes better and better with continued monitoring of the process.

In all cases of populating a failure mode database, the user designates the existence, type, and time stamp of a failure. The designation that a process or machine has failed is subject to the criteria of the user in any case. A failure may be deemed to have occurred at a first time for a user having stringent performance requirements, and may be deemed to have occurred at a later second time for a user willing to expend the machine or process machinery. Alternatively, the designation of a failure may also be accomplished using an automated system. For example, a gross threshold applied to the actual sensor signal as is known in the art, may be used to designate the time of a failure. The alerts of the present invention can also be thresholded or compared to some baseline in order to determine a failure. Thus, according to the invention, the failure time stamp is provided by the user, or by a separate automatic system monitoring a parameter against a failure threshold.

Three general possibilities may be provided for failure mode signature analysis, e.g., residual (raw or quantized) snapshot similarity, actual (raw or quantized) snapshot similarity or alert pattern correlation. The residual snapshot similarity discussed herein provides for a library of prior residual snapshots, i.e., the difference signals obtained preceding identified failure modes which may be compared using the above-described similarity engine and Equation 4 with a current residual snapshot to determine the development of a known failure mode. Using residual diagnosis, the residual snapshots are identified and stored as precursors to known failure modes. Various criteria may be employed for selecting snapshots representative of the failure mode residuals for use in the library and for determining the defining characteristics of the failure modes, and criteria for determination of the failure modes.

The actual snapshot similarity used for diagnosis is performed in a manner identical with the residual snapshot similarity. Instead of using residual snapshots, actual snapshots are used as precursor data. Then actual snapshots are compared to the failure mode database of precursor actuals and similarities between them indicate incipient failure modes, as described in further detail below.

The alert module output will represent decisions for each monitored sensor input, as to whether the estimate for it is different or the same. These can in turn be used for diagnosis of the state of the process or equipment being monitored. The occurrence of some difference decisions (alerts on a sensor) in conjunction with other sameness decisions (no alerts on a sensor) can be used as an indicator of likely machine or process states. A diagnostic lookup database can be indexed into by means of the alert decisions to diagnose the condition of the process or equipment being monitored with the inventive system. By way of example, if a machine is monitored with seven sensors, and based on previous autopsy experience, a particular failure mode is evidenced by alerts appearing at first on sensors #1 and #3, compounded after some generally bounded time by alerts appearing on sensor #4 additionally, then the occurrence of this pattern can be matched to the stored pattern and the failure mode identified. One means for matching the failure modes according to developing sensor alert patterns such as these is the use of Bayesian Belief Networks, which are known to those skilled in the art for use in quantifying the propagation of probabilities through a certain chain of events. However, simpler than that, the matching can be done merely by examining how many alerting sensors correspond to sensor alerts in the database, and outputting the best matches as identified failure mode possibilities. According to yet another method for matching the alert pattern to stored alert patterns, the alerts can be treated as a two-dimensional array of pixels, and the pattern analyzed for likeness to stored patterns using character recognition techniques known in the art.

Figure 12A:
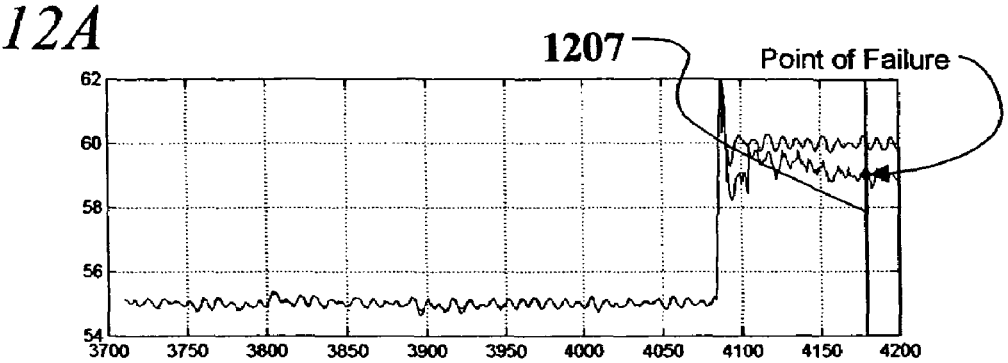
FIGS. 12A-12C illustrate alternative ranges from which to select failure mode signature information.
Figure 12B:
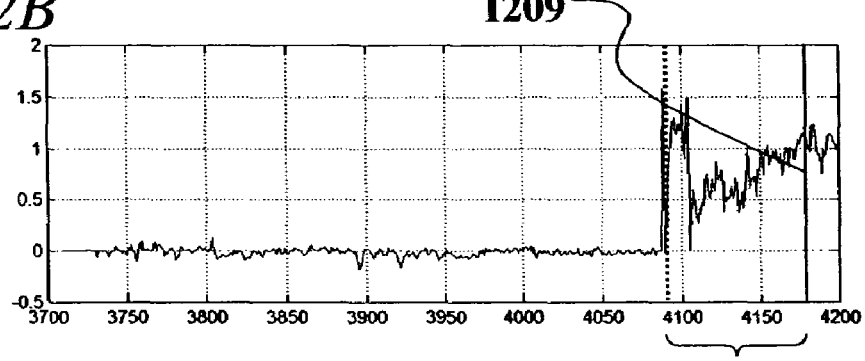
Figure 12C:
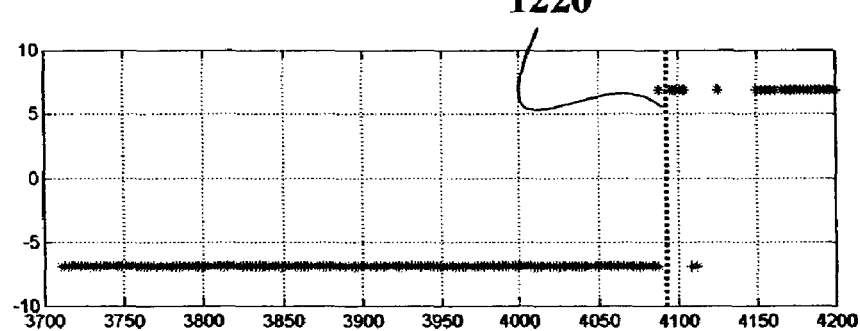

Turning to FIGS. 12A, 12B and 12C, several methods are shown for automatically selecting how far prior to a user-designated conventional failure point to go back when incorporating failure mode precursor snapshots into a library for purposes of the residual signature approach and the straight-data signature approach. Shown are the plots for a sensor and model estimate (FIG. 12A), residual (12B) and SPRT alerts (12C). The conventional point of failure as it would be understood in the prior art methods is shown in FIGS. 12A and 12B as line 1207 and 1209 respectively. Accordingly, the number of snapshots prior to a designated failure to include in "training" or distillation to a representative set that will form a failure mode library for either residual snapshot similarity or actual snapshot similarity can be determined as a fixed number selected by the user, either globally for all failures and failure modes, or specific to each autopsied failure. In other words, the user simply dictates based on his knowledge of the sampling rate of the monitoring of the process or machine, that snapshots are included up to, say, 120 prior to the time of failure. This then determines a range 1224 of residual snapshots (or actual snapshots) that are to be distilled.

According to another method of determining the length of range 1224, the location in FIG. 12C of line 1220 is used to determine the snapshot earliest snapshot in the set 1224. Line 1220 is determined as the earliest consistent SPRT or residual threshold-alerted snapshot, where "consistent" means that at least a selected number of snapshots in a moving window are alerted for at least a selected number of sensors. Thus, for example in a ten-sensor process, if at least two sensors have had at least three alerts in a seven-snapshot moving window, the beginning (or end) of that window demarks the beginning of range 1224. However, this would extend back only as far prior to the failure snapshot as there are consistent alerts. In other words, if at least the minimum number of alerts is found in a moving window going back to a time T, and before that the minimum number of alerts is not found until the window is approximately around T−50 (snapshots), the range to extend over for failure mode precursor selection extends back to T, not T−50.

The range 1224 of residual or actual snapshots, each snapshot comprising a residual value or actual value for each sensor, is then distilled to a representative set for the identified failure mode. This distillation process is essentially the same as the training method described in FIGS. 4 and 5 for developing a reference library for empirical modeling. The training process described in the flowchart of FIG. 5 can be used, as can other training methods known in the art or subsequently developed. In addition, if the instance of failure is of a mode already identified and possessing a library of precursor snapshots, then the library can be augmented. One way of augmenting it is to recombine all of the precursor snapshot sets for that failure mode from all documented instances of the failure, and rerun the training process against the combination. Another way is to add the range of snapshots 1224 to the existing distilled library, and rerun the training process against that combination.

This precursor data is processed to provide representative data and the associated failure mode, appropriate to the inventive technique chosen from the three prior mentioned techniques for diagnosing failures. This data is added to any existing data on the failure mode, and the system is set back into monitoring mode. Now, the system has more intelligence on precursor data leading up to the particular failure mode.

As with commodity machines, the failure mode granularity is entirely user-selectable. The failure modes can be strictly user defined, where the user must do the autopsy and determine cause. The user must furthermore supply a name and/or ID for the failure mode. The software product of the invention preferably provides an empty data structure for storing:

a. Failure mode name or ID.
 b. Description of what is the cause.
 c. Possible preventive or curative steps to take.
 d. Possibly can be linked to automated control response.
 e. Precursor signature data associated with the failure mode.

Figure 13:
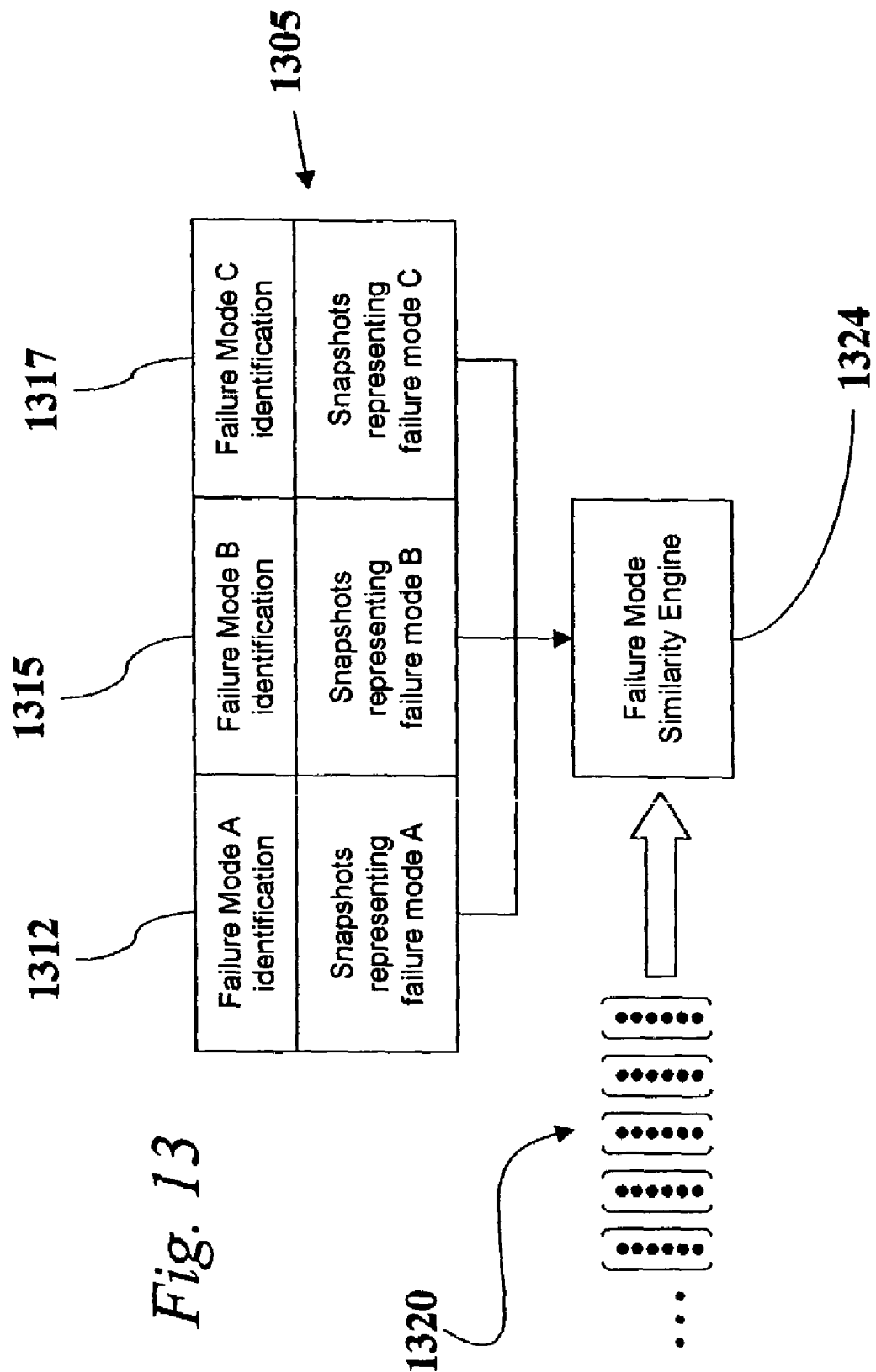
FIG. 13 illustrates failure mode recognition by similarity operation.

Turning to FIG. 13, the failure mode precursor reference library 1305 that is included in the failure mode database 140 from FIG. 1 can be seen to comprise groups of snapshots 1312, 1315 and 1317 that represent the precursor snapshots (either actual or residual) that are associated with the failure modes A, B and C respectively. A sequence 1320 of successive current input snapshots (either actual or residual, depending on the implemented embodiment), depicted as vectors with dots as placeholders for parameter values, is fed into a failure mode similarity engine 1324 (comprising the failure mode signature recognition module 120 from FIG. 1), disposed to calculate snapshot-to-snapshot similarities as described above with respect to the similarity operators used for modeling and Equation 4. Preferably, the snapshots of sequence 1320 all have an identical number of parameters, as do the snapshots in the library 1305. Unlike the empirical model described above for generating estimates, the engine 1324 does not carry out Equation 1 above, and thus does not output estimates of any kind, but instead outputs the snapshot similarity scores of each current snapshot as compared to each stored snapshot for at least some and preferably all modes in the library 1305.

Figure 14:
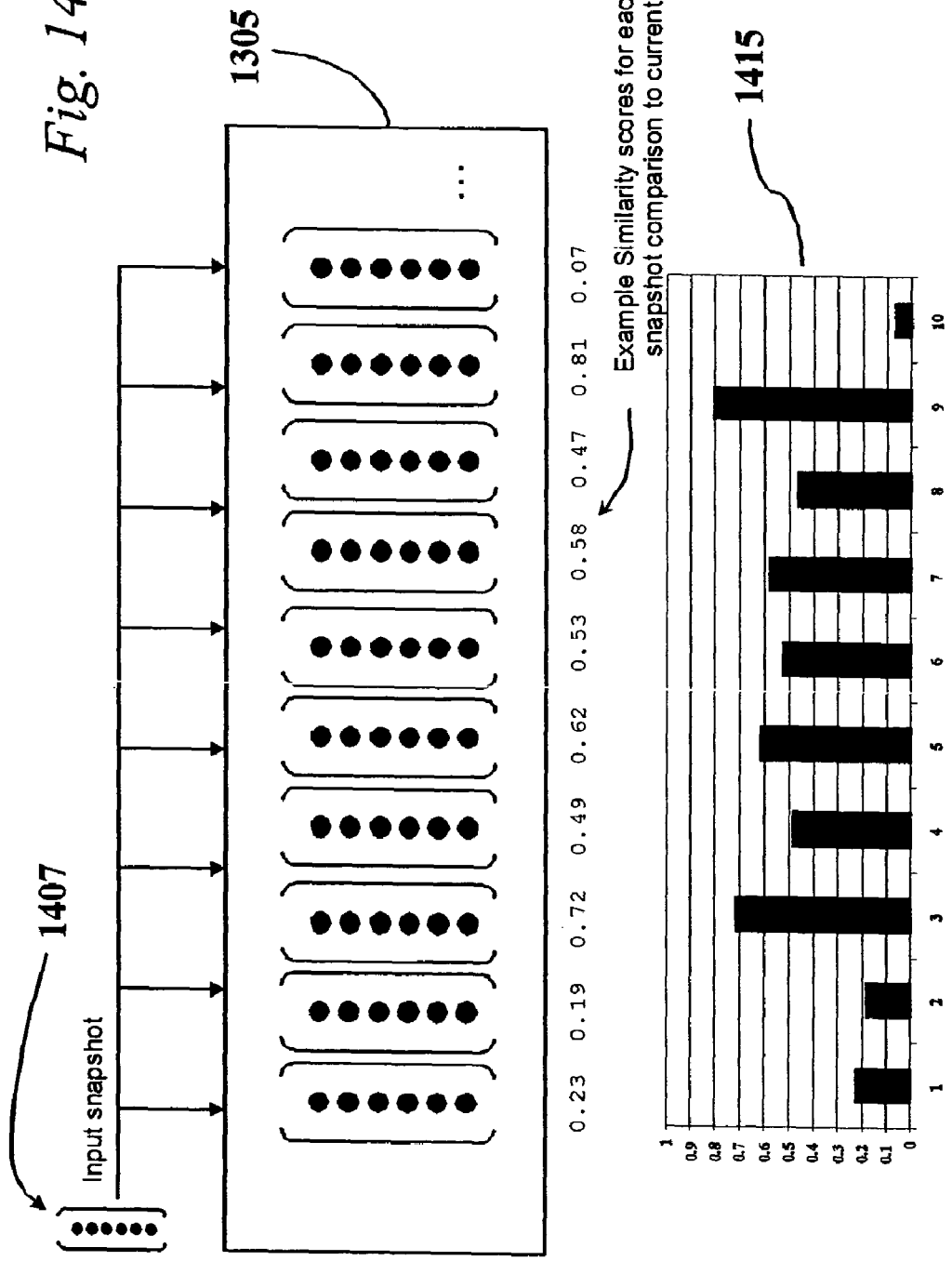
FIG. 14 illustrates similarity score generation for an input snapshot.

The failure mode similarity engine 1324 of FIG. 13 can better be understood in view of FIG. 14, wherein is shown the results for a comparison of a single snapshot 1407 of either actual data from sensors or residual data from the difference of the actual and estimated data for sensors, when compared using the similarity operator to the failure mode precursors in the library 1305. Each snapshot-to-snapshot comparison results in a similarity value, which are charted in chart 1415.

Figure 15:
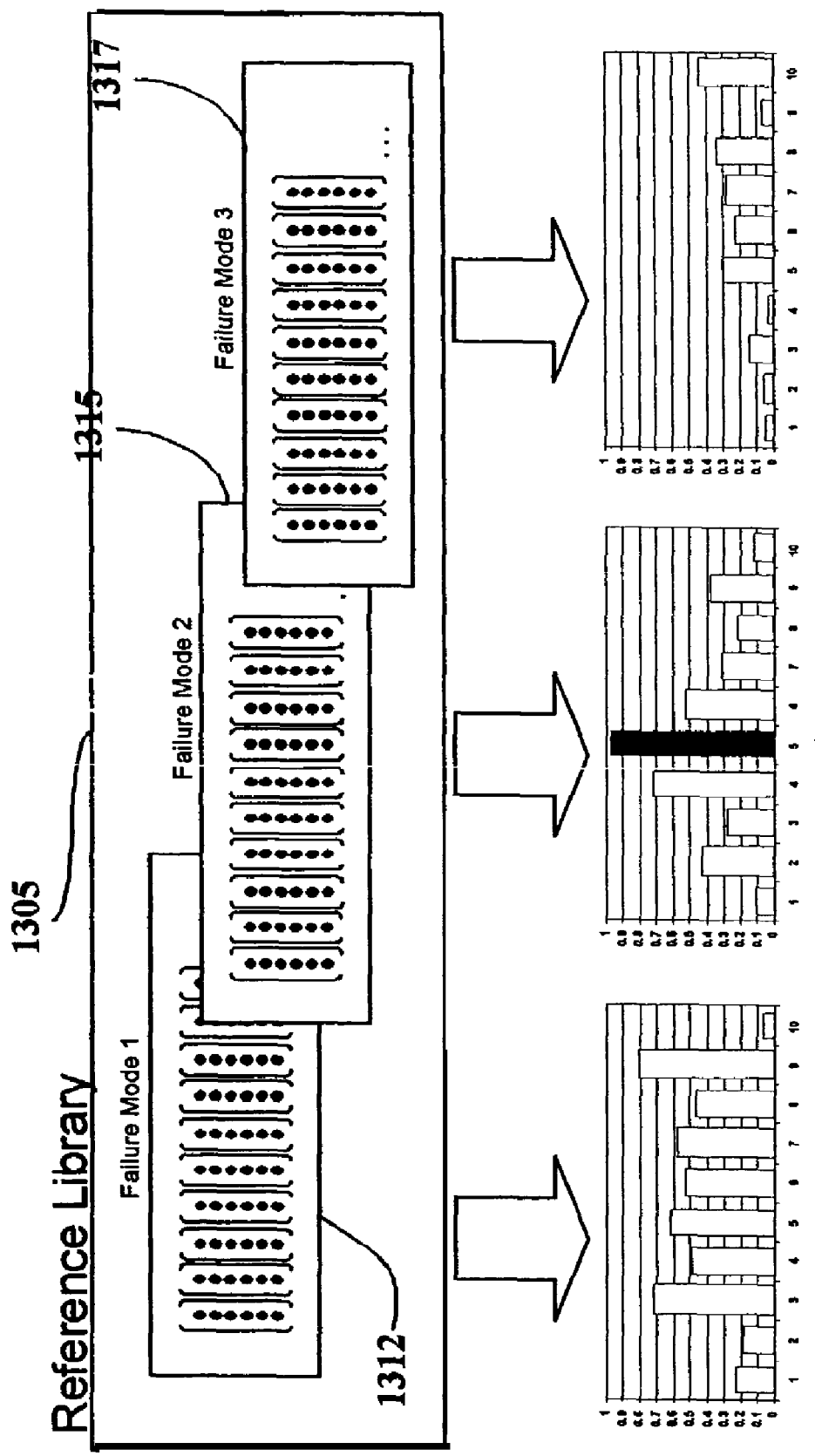
FIG. 15 illustrates selection of a diagnosed failure mode on the basis of a highest similarity score.
Figure 16:
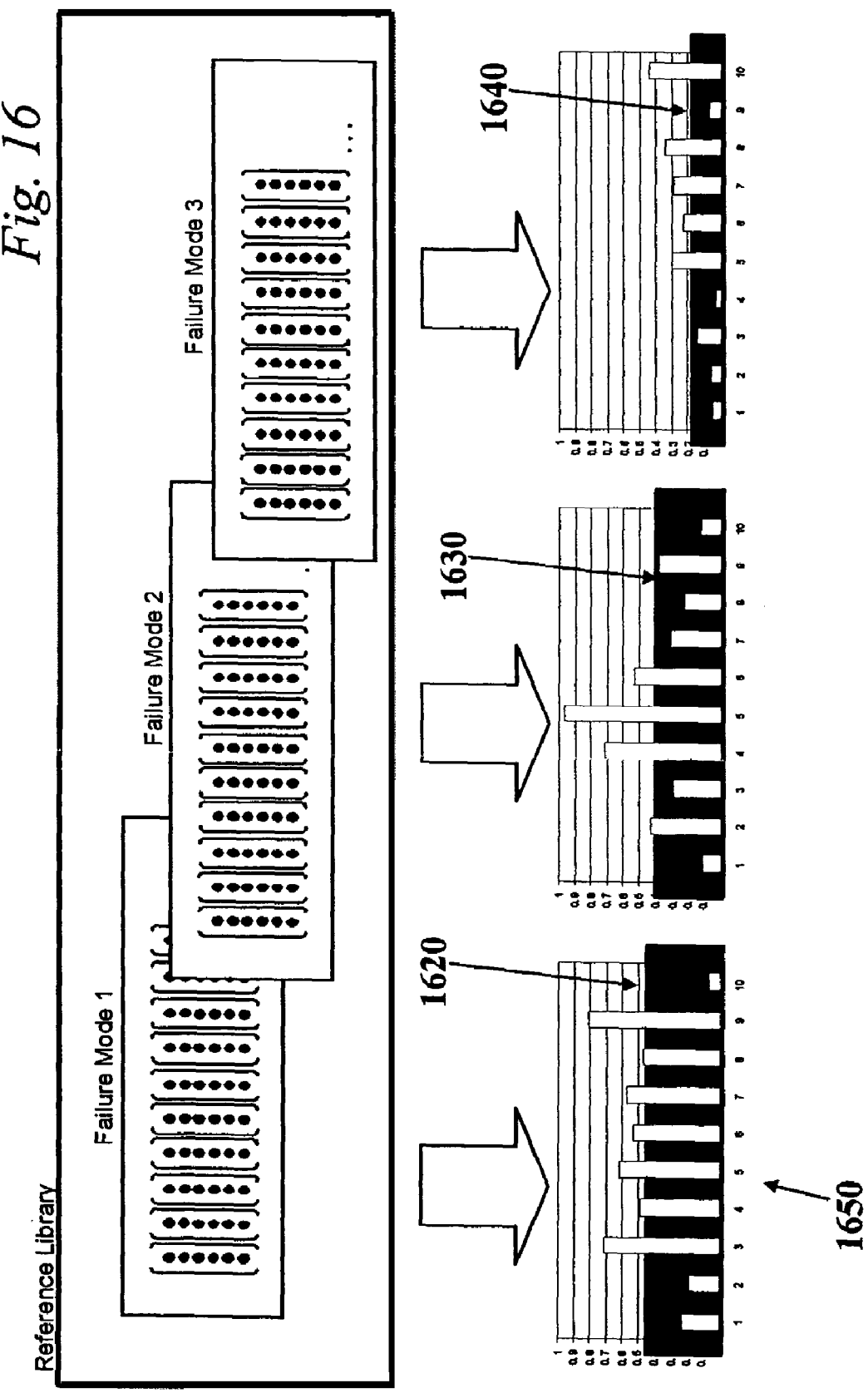
FIG. 16 illustrates selection of a diagnosed failure mode on the basis of a highest average similarity score.

In order to determine one or more failure modes to indicate as output of the diagnostic system of the present invention when employing residual similarity or actual signal similarity, one way of selecting such identified or likely failure mode(s) is shown with respect to FIG. 15. Reference library 1305 contains failure mode signature data (either residual snapshots or actual snapshots) for several failure modes 1312, 1315 and 1317. A current snapshot is compared using the similarity operation to generate similarity scores for each comparison to reference library snapshots. The failure mode with a single-snapshot similarity 1550 that is highest across all such comparisons in the reference library is designated as the indicated failure mode. In another way of selecting the indicated failure mode, as shown in FIG. 16, the average of all the snapshot similarities for all snapshots in a given failure mode is computed, and the averages 1620, 1630 and 1640 for each failure mode are compared. The failure mode 1650 with the highest average similarity is designated as the indicated failure mode for the current snapshot. Either way of designating an indicated failure mode for a given current snapshot, as shown in FIGS. 15 and 16, can be combined with a number of alternative ways of selecting the indicated failure mode over successive snapshots. Accordingly, no failure mode may be displayed to the user based on just one snapshot, but a moving window of snapshots over which a count of elected failure modes according to FIG. 15 or 16 is maintained can be used to output to the user an indication of an incipient failure, if the count for any given failure mode over the window exceeds a certain number. For example, the method of electing the failure mode with the highest average similarity (FIG. 16) may be used for each current snapshot, and a moving window of twenty (20) snapshots may be used, and a threshold is employed according to which a failure mode must be elected at least 10 times in that window in order for that failure mode to be indicated as an incipient failure mode to the user. Counts are maintained for all failure modes in the system over the twenty snapshot window, and if one of them achieves a count of greater than 10, it is indicated as an incipient failure to the user.

Other methods of statistically combining the similarities across the set of all stored residual or actual snapshots in the signature library for a given failure mode may be used to get the "average", such as using only the middle 2 quartiles and averaging them (thus throwing away extreme matches and extreme mismatches); or only using the top quartile; and so on. Regardless of the test used to determine the one or more indicated "winning" failure modes in each snapshot, "bins" accumulate "votes" for indicated failure modes for each current snapshot, accumulating over a moving window of dozens to hundreds of snapshots, as appropriate. A threshold may also be used such that the failure mode "latches" and gets indicated to the human operator as an exception condition.

Alternatively, it is possible to not use any such threshold, but to simply indicate for the moving window which failure mode has the highest count of being designated the indicated failure mode snapshot over snapshot. Another useful output of the system that may be displayed to the user is to indicate the counts for each failure mode, and let the user determine from this information when a particular failure mode seems to be dominating. Under normal operation, it is likely all the failure modes will have approximately equal counts over the window, with some amount of noise. But as a failure mode is properly recognized, the count for that failure mode should rise, and for the other failure modes drop, providing a metric for the user to gauge how likely each failure mode is compared to the others.

Figure 17:
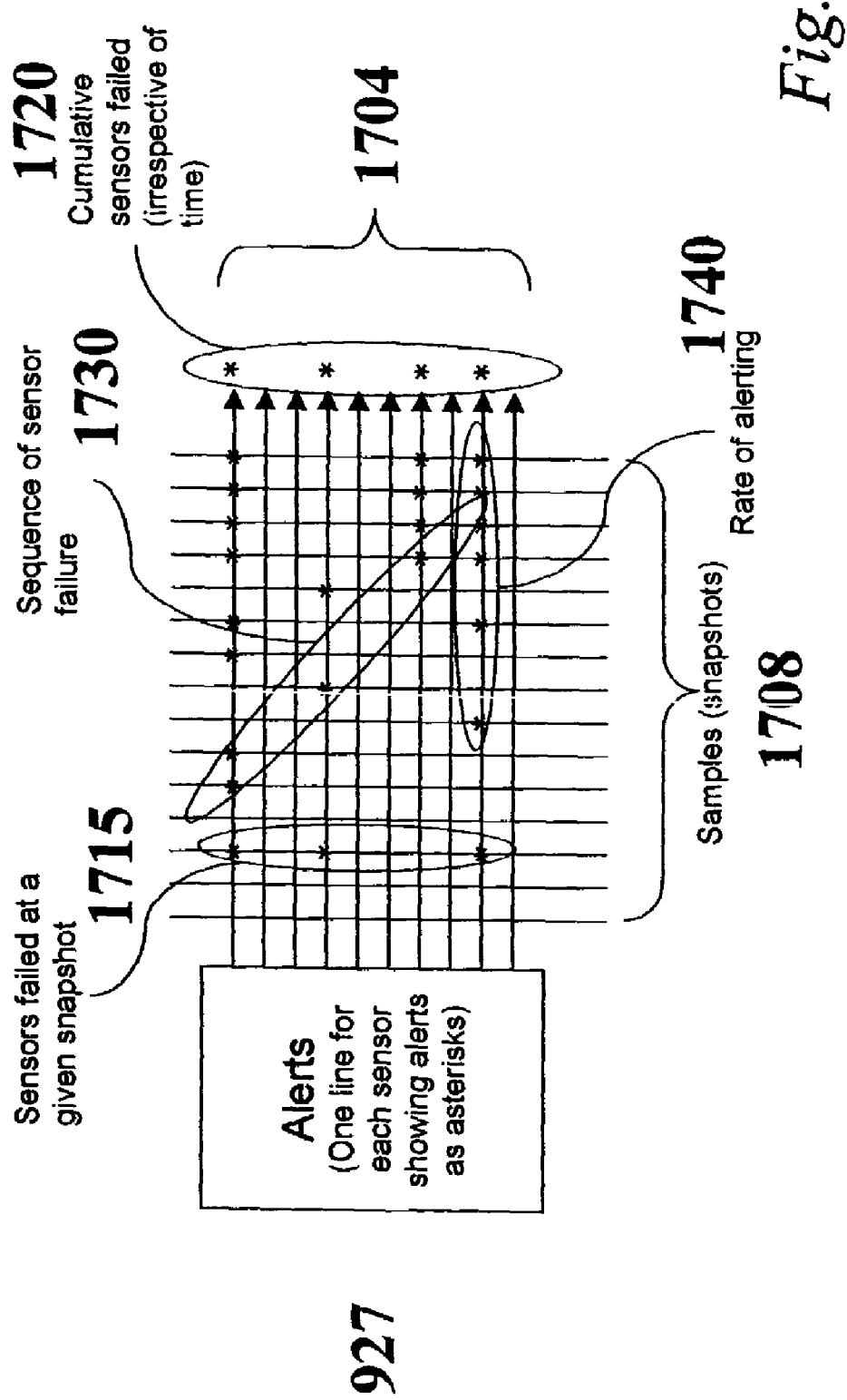
FIG. 17 shows failure mode recognition on the basis of an alert pattern.

Turning to FIG. 17, several methods for designating the indicated failure mode, if any, are shown with respect to using alert patterns. Alert test 927 (from FIG. 9) generates alerts on signal lines 1704, at each of successive snapshots 1708, as indicated by the asterisks. According to one method, the pattern 1715 of alerts at any given snapshot can be matched to the patterns stored for various failure modes, to determine whether or not a failure mode is indicated. According to another method, the cumulative pattern 1720 of alerts can be matched against stored patterns, where alert accumulation occurs over a window of a selected number of snapshots. Yet another way is to match the sequence 1730 in which sensors alert to sequences in the database, such that alerts appearing first on sensor 1, then sensor 4, and then sensor 9 would be different from first appearing on sensor 4, and then sensors 1 and 9. Finally, the rate 1740 of sensor alerting can be matched to stored rates. A combination of these can also be used to provide more sophisticated differentiation of failure mode signatures.

The pattern match for any of the above alert patterns can be selected from a number of techniques. For example, a complete match may be required, such that a match is not indicated unless each and every alert in the stored pattern is also found in the instant pattern, and no extraneous alerts are found in the instant pattern. Alternatively, a substantial match can be employed, such that at least, say, 75% of the sensors showing alerts in the stored pattern are also found alerting in the instant pattern, and no more than 10% of the instant alerts are not found in the stored pattern. The exact thresholds for matching and extraneous alerts can be set globally, or can be set for each stored pattern, such that one failure mode may tolerate just 65% matching and no more than 10% extraneous alerts, while a second failure mode may be indicated when at least 80% of the stored alerts are matched, and no more than 5% extraneous alerts occurring in the instant pattern are not in the stored pattern. These limits may be set empirically, as is necessary to sufficiently differentiate the failure modes that are desirably recognized, and with sufficient forewarning to provide benefit.

According to the invention, it is also permissible to indicate more than one potential failure mode, if pattern matching has these results. Techniques are known in the art for matching patterns and providing probabilities of the likelihood of the match, and any and all of these may be employed within the scope of the present invention.

Figure 18:
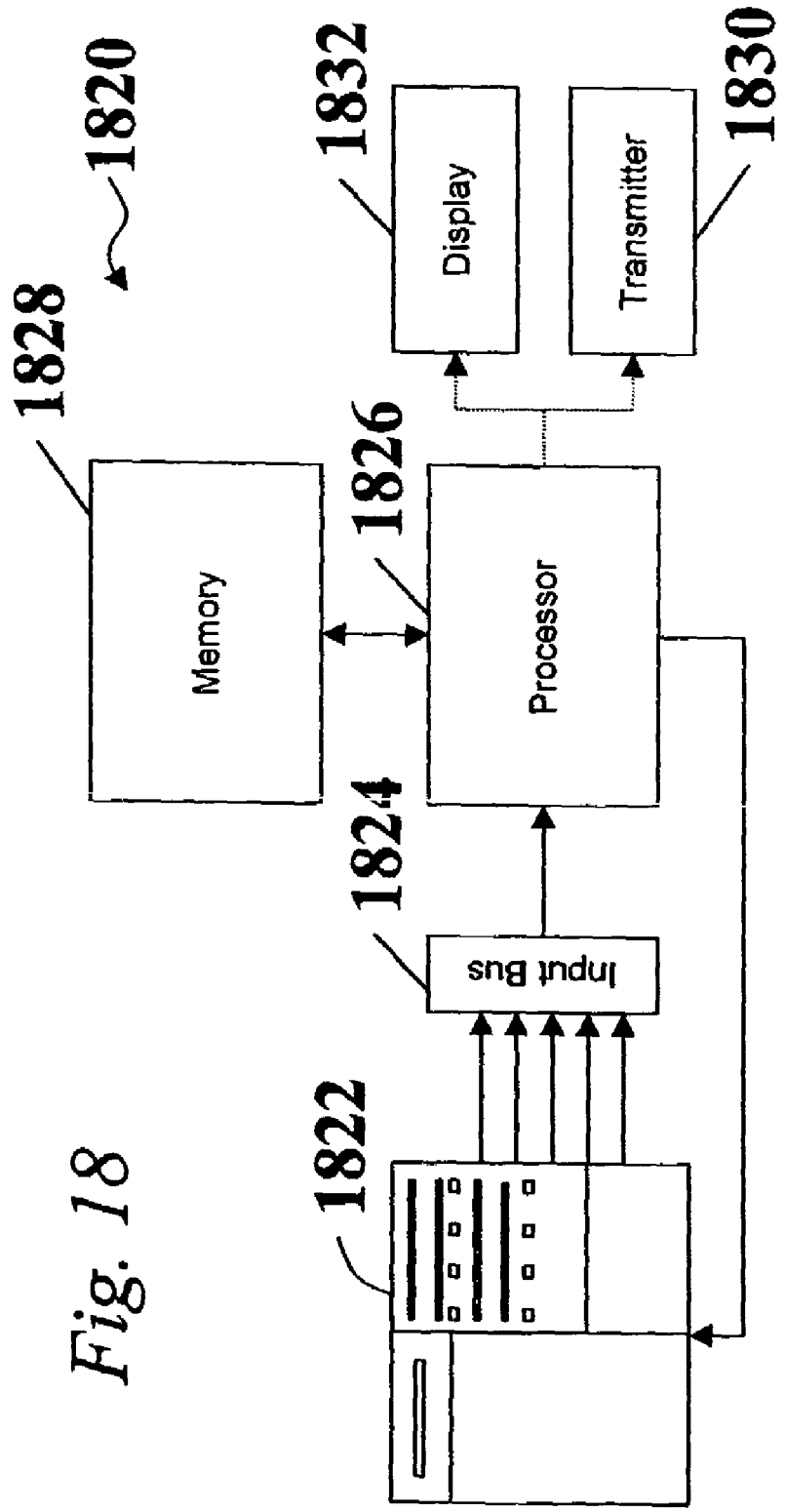
FIG. 18 is a schematic block diagram of a hardware implementation of the present invention.

FIG. 18 shows a physical embodiment 1820 for any of the inventive approaches to diagnosis disclosed herein. A process or machine 1822 provides sensor output to an input bus 1824. For example, the process might be a process control system at a chemical processing plant, and the bus is the FieldBus-type architecture commonly used in industry. A processor 1826 is disposed to calculate the model estimates of the parameters in response to the input of the actual parameters from bus 1824, and further to compare the estimates to the actual sensor values and compute alert tests. Processor 1826 is further disposed to execute failure signature recognition, when coupled with a memory 1828 for storing program code and loaded with model and signature data. The processor can output control commands back to the process control system for corrective action in the event of a diagnosis of an impending failure. Also, the processor can output the resulting diagnosis and accompanying data to a display 1832, or can also optionally send it via a transmitter 1830 to a remote location; the transmitter could be a web-connected device, or a wireless device, by way of example. The receiver (not shown) could be a pager, another data processing system at a remote location, and the like.

Generally, the failure mode data store can be in any conventional memory device, such as a hard disk drive, nonvolatile or volatile memory, or on-chip memory. The data store for the empirical modeling data that is used to generate the estimates of parameters in response to actual parameter values can be separate from or the same as the data store which contains failure mode signature information. Further, failure mode action suggestions can also be stored either together with or separately from the other aforementioned data. Such may be the case where the present invention comprises combing a failure mode signature recognition system with an existing maintenance operations resource planning system that automatically generates maintenance requests and schedules them. The computational programs for performing similarity-based residual or actual sensor snapshot failure mode signature recognition; alert pattern-based failure mode signature recognition; process modeling and sensor value estimation; residual generation from actual and estimated values; and alert testing can be carried out on one processor, or distributed as separate tasks across multiple processors that are in synchronous or asynchronous communications with one another. In this way, it is entirely within the inventive scope for the diagnostic system of the present invention to be carried out using a single microprocessor on-board a monitored machine, or using a number of separately located computers communicating over the internet and possibly remotely located from the monitored process or machine. The computational program that comprises the similarity engine that generates estimates in response to live data can also be the same programmed similarity engine that generates similarity scores for use in matching a residual snapshot or actual snapshot to stored snapshots associated with failure modes.

It will be appreciated by those skilled in the art, that modifications to the foregoing preferred embodiments may be made in various aspects. Other variations clearly would also work, and are within the scope and spirit of the invention. The present invention is set forth with particularity in the appended claims. It is deemed that the spirit and scope of that invention encompasses such modifications and alterations to the preferred embodiment as would be apparent to one of ordinary skill in the art and familiar with the teachings of the present application.

What is claimed is:

1. A monitoring apparatus for diagnosing faults in a system, comprising:
 a kernel-based non-parametric model responsive to monitored parameter data from said system for generating estimates of the monitored parameter data;
 an alert module disposed to produce parameter alerts in response to a comparison of said estimates to said monitored data; and
 a failure identification module for identifying an impending failure mode in said system by matching said parameter alerts with at least one reference alert pattern associated with said failure mode.

2. An apparatus according to claim 1, wherein said alert module performs a sequential probability ratio test on at least one parameter.

3. An apparatus according to claim 1, wherein said alert module produces an alert when the difference of an estimate and corresponding monitored data exceeds a selected threshold.

4. An apparatus according to claim 1, wherein said kernel-based non-parametric model employs a Nadaraya-Watson kernel regression.

5. An apparatus according to claim 1, wherein said kernel-based non-parametric model is a similarity-based model.

6. An apparatus according to claim 5, wherein said failure identification module identifies an impending failure mode in said system by matching a combination of parameter alerts occurring together in a given time stamp to a reference alert pattern associated with said failure mode.

7. An apparatus according to claim 5, wherein said failure identification module identifies an impending failure mode in said system by matching a sequence in which at least some of said monitored parameters exhibit alerts over successive time stamps to a reference alert pattern associated with said failure mode.

8. An apparatus according to claim 5, wherein said failure identification module identifies an impending failure mode in said system by matching a combination of parameters that have exhibited alerts cumulatively over a period of time to a reference alert pattern associated with said failure mode.

9. An apparatus according to claim 5, wherein said similarity-based model uses a similarity function in connection with a set of reference observations of normal system behavior, whereby an elemental similarity between a monitored parameter and a corresponding value from said set of reference observations is proportional to the difference of the monitored parameter and the corresponding value, divided by an expected range for the monitored parameter; and wherein similarity between an observation of monitored parameter data and an observation in said reference set is an average of the elemental similarities of each of said monitored parameters with their respective corresponding values.

10. A method for diagnosing faults in a monitored system, comprising the steps of:
    comparing for similarity monitored parameter data from said system to reference parameter data characteristic of known behavior of said system;
    generating estimates of the monitored parameter data based on the similarity comparison;
    generating alerts in response to a comparison of said estimates to said monitored data; and
    identifying an impending failure mode in said system by matching said parameter alerts with at least one reference alert pattern associated with said failure mode.

11. A method according to claim 10, wherein said alert generating step comprises performing a sequential probability ratio test on at least one parameter.

12. A method according to claim 10, wherein said alert generating step comprises producing an alert when the difference of an estimate and corresponding monitored data exceeds a selected threshold.

13. A method according to claim 10 wherein said identifying step comprises matching a combination of parameter alerts occurring together in a given time stamp to a reference alert pattern associated with said failure mode.

14. A method according to claim 10 wherein said identifying step comprises matching a sequence in which at least some of said monitored parameters exhibit alerts over successive time stamps to a reference alert pattern associated with said failure mode.

15. A method according to claim 10 wherein said identifying step comprises matching a combination of parameters that have exhibited alerts cumulatively over a period of time to a reference alert pattern associated with said failure mode.

16. A method for diagnosing faults in a monitored system, comprising the steps of:
    comparing for similarity monitored parameter data from said system to reference parameter data characteristic of known behavior of said system;
    generating estimates of the monitored parameter data based on the similarity comparison;
    differencing the estimates and the monitored data to generate residual data; and
    comparing for similarity the residual data to reference residual data associated with a failure mode, as a diagnostic indication of said failure mode.

17. A method according to claim 16, further comprising the step of communicating a remedial control command to a control program for said system.

18. A method according to claim 16, further comprising the steps of:
    recognizing an impending failure mode based on the residual similarity comparison step; and
    controlling remedially said system responsive to recognition of an impending failure of said system.

19. A method according to claim 16, wherein said differencing step includes quantizing said residual data, and where said reference residual data is likewise quantized.

20. A method according to claim 18, wherein said step of comparing residual data for similarity comprises forming a residual observation comprised of a residual for each monitored parameter at a given time stamp; generating a similarity measure using a similarity operator or said residual observation with an observation from said reference residual data associated with a failure mode; and using said residual similarity measure to indicate the presence or absence of said failure mode.

21. A computer program product for diagnosing faults in a monitored system, comprising computer readable media with computer readable program instructions thereon comprising:
    a kernel-based non-parametric model program module for causing a processor to generate estimates of parameter signals from said system, and difference the parameter signals and the estimates to generate residual signals;
    a residual testing program module for causing a processor to generate alerts in response to said residual signals characterizing behavior of said system; and
    a fault pattern detection program module disposed to cause a processor to receive said alerts and indicate a fault diagnosis in said system upon matching the alerts to a reference pattern associated with said fault.

22. A program product according to claim 21, wherein the residual testing program module performs a sequential probability ratio test on said residuals.

23. A program product according to claim 21, wherein the residual testing program module compares a residual to a threshold to generate an alert when the residual exceeds the threshold.

24. A program product according to claim 21, wherein said kernel-based non-parametric model program module employs a similarity-based model to generate said estimates.

25. A program product according to claim 24 wherein said similarity-based model uses elemental similarities.

26. A program product according to claim 24 wherein said similarity-based model is a radial basis function network.

27. A program product according to claim 21 wherein said kernel-based non-parametric model program module employs a kernel regression model to generate said estimates.

28. A program product according to claim 21, wherein said residual testing program module causes a processor to generate alerts in the form of quantized residuals.

29. A program product according to claim 24 wherein said fault pattern detection program module causes a processor to match a combination of alerts occurring together in a given time stamp to a reference pattern associated with said failure mode.

30. A program product according to claim 24 wherein said fault pattern detection program module causes a processor to match a sequence in which at least some of said monitored parameters exhibit alerts over successive time stamps to a reference pattern alert sequence associated with said failure mode.

31. A program product according to claim 24 wherein said fault pattern detection program module causes a processor to match a combination of parameters that have exhibited alerts cumulatively over a period of time to a reference pattern of cumulative alerts associated with said failure mode.

32. A diagnostic monitoring apparatus for a sensor-instrumented system selected from a process and a machine, comprising:
    an operational model module for modeling said system and generating estimates for said sensors in response to receiving actual values of said sensors;
    a differencing module for generating residual signals from said estimates and said actual values;
    a reference library for storing failure modes and associated residual data values; and
    a failure mode recognition engine disposed to compare generated residual signals with said residual data values to select and output a recognized failure mode for said system.

33. A diagnostic monitoring apparatus according to claim 32, wherein said failure mode recognition engine comprises a similarity operation module for generating a similarity score for a comparison of said generated residual signals with said residual data values in said reference library.

34. A diagnostic monitoring apparatus according to claim 33, wherein said failure mode recognition engine further comprises a failure mode decision module responsive to the similarity scores generated by the similarity operation module to select at least one failure mode to output.

35. A diagnostic monitoring apparatus for a sensor-instrumented system selected from a process and a machine, comprising:
    an operational model module for modeling said system and generating estimates for said sensors in response to receiving actual values of said sensors;
    a differencing module for generating residual signals from said estimates and said actual values;
    a testing module disposed to receive said residual signals and generate alerts in response thereto;
    a reference library for storing failure modes and associated alert signatures; and
    a failure mode recognition engine disposed to compare generated alerts with said alert signatures to select and output a recognized failure mode for said system.

36. An apparatus according to claim 32, wherein said differencing module generates residual signals as quantized residuals, and said reference library stores associated residual data values in a likewise quantized fashion.

37. An apparatus according to claim 35, wherein said reference library stores associated alert signatures as combinations of alerts occurring together in a given time stamp across said sensors.

38. An apparatus according to claim 35, wherein said reference library stores associated alert signatures as sequences of alerts occurring over successive time stamps across said sensors.

39. An apparatus according to claim 35, wherein said reference library stores associated alert signatures as a combination of sensors that have exhibited alerts cumulatively over a period of time.

* * * * *

UNITED STATES PATENT AND TRADEMARK OFFICE
CERTIFICATE OF CORRECTION

| | | |
|---|---|---|
| PATENT NO. | : 7,539,597 B2 | Page 1 of 1 |
| APPLICATION NO. | : 10/681888 | |
| DATED | : May 26, 2009 | |
| INVENTOR(S) | : Stephan W. Wegerich et al. | |

It is certified that error appears in the above-identified patent and that said Letters Patent is hereby corrected as shown below:

Title Page, item (75) Inventors, Line 3, delete "Woodridge" and insert -- Brookfield --, therefor.

Signed and Sealed this

Fourth Day of August, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,539,597 B2  
APPLICATION NO. : 10/681888  
DATED : May 26, 2009  
INVENTOR(S) : Stephan W. Wegerich et al.

It is certified that error appears in the above-identified patent and that said Letters Patent is hereby corrected as shown below:

Page 1, Column 1, Inventors Box, Line 3, delete "Woodridge" and insert -- Brookfield --, therefor.

Signed and Sealed this

Eleventh Day of August, 2009

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,539,597 B2 | Page 1 of 1 |
| APPLICATION NO. | : 10/681888 | |
| DATED | : May 26, 2009 | |
| INVENTOR(S) | : Stephan W. Wegerich et al. | |

It is certified that error appears in the above-identified patent and that said Letters Patent is hereby corrected as shown below:

This certificate vacates the Certificate of Correction issued August 11, 2009. The certificate is a duplicate of the Certificate of Correction issued August 4, 2009. All requested changes were included in the Certificate of Correction issued August 4, 2009.

Signed and Sealed this

Eighth Day of September, 2009

David J. Kappos
*Director of the United States Patent and Trademark Office*